(12) United States Patent
Hashimoto et al.

(10) Patent No.: US 7,193,671 B2
(45) Date of Patent: Mar. 20, 2007

(54) REFLECTIVE LIQUID CRYSTAL DISPLAY DEVICE HAVING OBLIQUELY EVAPORATED ALIGNMENT FILM ON VERTICALLY EVAPORATED FILM, METHOD OF MANUFACTURING THE SAME, AND VERTICALLY ALIGNED LIQUID CRYSTAL DISPLAY UNIT

(75) Inventors: Shunichi Hashimoto, Kanagawa (JP); Tadaaki Isozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 10/925,480

(22) Filed: Aug. 25, 2004

(65) Prior Publication Data

US 2005/0052600 A1    Mar. 10, 2005

(30) Foreign Application Priority Data

Sep. 2, 2003    (JP)    ............................. P2003-309875
Sep. 2, 2003    (JP)    ............................. P2003-309876

(51) Int. Cl.
*G02F 1/1337*    (2006.01)
(52) U.S. Cl. ....................... 349/125; 349/130
(58) Field of Classification Search ................ 349/125, 349/130
See application file for complete search history.

(56) References Cited

U.S. PATENT DOCUMENTS 5,227,904 A * 7/1993 Nakanowatari ............. 349/172

2005/0057715 A1* 3/2005 Hashimoto ................. 349/125

FOREIGN PATENT DOCUMENTS

| EP | 0 541 388 | 5/1993 |
| JP | 51-3659 | 1/1976 |
| JP | 53-086235 | 7/1978 |
| JP | 56-088113 | 7/1981 |
| JP | 56-91217 | 7/1981 |
| JP | 57-112714 | 7/1982 |
| JP | 2001-005003 | 1/2001 |
| JP | 2002-268066 | 9/2002 |
| JP | 2003-107482 | 4/2003 |

OTHER PUBLICATIONS

H. Vithana, et al., "*Controlled Tilted Homeotropic Alignment of Liquid Crystals for Display Applications*", Japanese Journal of Applied Physics, Tokyo, JP, vol. 35, No. 3A, pp. L320-L323 XP000732106 1996).

* cited by examiner

*Primary Examiner*—Andrew Schechter
(74) *Attorney, Agent, or Firm*—Sonnenschein Nath & Rosenthal LLP

(57) ABSTRACT

In a reflective liquid crystal display device according to the invention, while maintaining alignment characteristics by an obliquely evaporated alignment film, an electrical problem due to the film structure can be solved, and ions of the like can be prevented from passing through an alignment film, thereby long-term drive reliability can be achieved. Further, misalignment and nonuniform alignment due to the structure of an inter-pixel groove can be prevented so as to achieve superior image quality.

20 Claims, 12 Drawing Sheets

| | No. | THICKNESS OF VERTICALLY EVAPORATED FILM (nm) | THICKNESS OF OBLIQUELY EVAPORATED FILM (nm) | THICKNESS OF PASSIVATION FILM (nm) | BURN-IN IN LONG-TERM DRIVE |
|---|---|---|---|---|---|
| COMPARATIVE EXAMPLE | 1 | — | 50 | — | OBSERVED AFTER 200 HR |
| COMPARATIVE EXAMPLE | 2 | — | 50 | 45 | OBSERVED AFTER 200 HR |
| EXAMPLE | 1 | 50 | 50 | — | NOT OBSERVED FOR 1000 HR OR MORE |
| EXAMPLE | 2 | 50 | 50 | 45 | NOT OBSERVED FOR 1000 HR OR MORE |

FIG. 12

| | No. | PIXEL PITCH ($\mu m$) | WIDTH OF INTER-PIXEL GROOVE ($\mu m$) | THICKNESS OF PASSIVATION FILM ($\mu m$) | MISALIGNMENT IN INTER-PIXEL GROOVE |
|---|---|---|---|---|---|
| COMPARATIVE EXAMPLE | 3 | 9 | 0.6 | — | OBSERVED |
| COMPARATIVE EXAMPLE | 4 | 9 | 0.35 | — | OBSERVED |
| COMPARATIVE EXAMPLE | 5 | 9 | 0.6 | 0.045 | OBSERVED |
| COMPARATIVE EXAMPLE | 6 | 9 | 0.35 | 0.045 | OBSERVED |
| EXAMPLE | 3 | 9 | 0.6 | — | NOT OBSERVED |
| EXAMPLE | 4 | 9 | 0.35 | — | NOT OBSERVED |
| EXAMPLE | 5 | 9 | 0.6 | 0.045 | NOT OBSERVED |
| EXAMPLE | 6 | 9 | 0.35 | 0.045 | NOT OBSERVED |

FIG. 13

REFLECTIVE LIQUID CRYSTAL DISPLAY DEVICE HAVING OBLIQUELY EVAPORATED ALIGNMENT FILM ON VERTICALLY EVAPORATED FILM, METHOD OF MANUFACTURING THE SAME, AND VERTICALLY ALIGNED LIQUID CRYSTAL DISPLAY UNIT

RELATED APPLICATION DATA

The present application claims priority to Japanese Application(s) No(s). P2003-309876 filed Sep. 2, 2003, and P2003-309875 filed Sep. 2, 2003, which application(s) is/are incorporated herein by reference to the extent permitted by law.

BACKGROUND OF THE INVENTION

1. Field of the Invention

The present invention relates to a reflective liquid crystal display device comprising a reflective pixel electrode, a method of manufacturing the same, and a liquid crystal display unit such as a reflective liquid crystal projector which displays an image through the use of the reflective liquid crystal display device.

2. Description of the Related Art

In recent years, with improvement in definition, miniaturization and brightness of projection displays, as display devices of the projection displays, reflective devices capable of reducing their size and displaying with high definition, and being expected to have high light utilization efficiency have become a focus of attention and have been put to practical use. A well-known reflective device is an active type reflective liquid crystal device in which a liquid crystal is injected between a pair of substrates facing each other. In this case, as the pair of substrates, a transparent electrode substrate formed through laminating a transparent electrode on a glass substrate, and a drive substrate using a silicon (Si) substrate which includes, for example, a CMOS (Complementary-Metal Oxide Semiconductor) type semiconductor circuit are used. On the drive substrate, a reflective pixel electrode of metal for reflecting light and applying a voltage to the liquid crystal is disposed so as to form a pixel electrode substrate. The reflective pixel electrode is made of a metal material including aluminum as a main component, which is generally used in a LSI (Large Scale Integrated) process.

In such a reflective liquid crystal display device, when a voltage is applied to the transparent electrode disposed on the transparent electrode substrate and the reflective pixel electrode disposed on the drive substrate, a voltage is applied to the liquid crystal. At this time, a change in optical properties of the liquid crystal occurs depending upon a potential difference between these electrodes, thereby the liquid crystal modulates incident light. The reflective liquid crystal display device can display a gray-scale image by the modulation of the light.

In such a reflective liquid crystal display device, specifically an active type reflective liquid crystal display device into which a vertically aligned liquid crystal is injected has become a focus of attention as a projection device in recent years, because the active type reflective liquid crystal display device has high contrast and high response speed. Herein, "a vertically aligned liquid crystal material" means a liquid crystal material with negative dielectric anisotropy (a difference $\Delta\in(=\in(\|)-\in(\perp))$ between a dielectric constant $\in(\|)$ parallel to a long axis of liquid crystal molecules and a dielectric constant $\in(\perp)$ perpendicular to the long axis of the liquid crystal molecules is negative), and in the vertically aligned liquid crystal material, when an applied voltage is zero, the liquid crystal molecules are aligned in a substantially vertical direction with respect to a substrate surface, thereby the active type reflective liquid crystal display device operates in a normally black mode.

In the vertically aligned liquid crystal, when an applied voltage is zero, the long axis of the molecules of the vertically aligned liquid crystal is aligned in a substantially vertical direction with respect to each substrate surface, and when a voltage is applied, the long axis is inclined in an in-plane direction, thereby the transmittance of the vertically aligned liquid crystal changes. If the directions where the liquid crystal molecules are inclined are not uniform during drive, the contrast becomes uneven. In order to prevent uneven contrast, it is required to align liquid crystal molecules at a very small pretilt angle in a predetermined direction in advance, then vertically align them. The predetermined direction is a diagonal direction of the pixel electrode (that is, a 45° direction). When the pretilt angle is too large, vertical alignment is degraded, thereby a black level is increased, and the contrast declines. Therefore, in general, the pretilt angle is controlled within a range from approximately 1° to 5° with respect to the direction of the normal to a substrate surface.

There are two methods of aligning the vertically aligned liquid crystal material, that is, a method of controlling alignment by using an organic alignment film typified by polyimide and rubbing it, and a method of controlling alignment through oblique evaporation by using an inorganic alignment film typified by silicon oxide. Nowadays, in order to achieve higher brightness of a projector, there is a tendency that the power of a lamp is increased to irradiate a display panel with light with very high intensity. Therefore, there is a problem that the organic alignment film in the former method is degraded due to the light.

On the other hand, an obliquely evaporated film of silicon oxide in the latter method is an inorganic material, so unlike polyimide, no degradation in the material due to light occurs, and higher reliability can be achieved. Therefore, the obliquely evaporated film becomes a focus of attention. In the case where the alignment film is the obliquely evaporated film of silicon oxide, the incident angle of evaporation particles to a substrate is changed during oblique evaporation to control the pretilt angle. In general, a practical incident angle is within a range from approximately 45° to 65° with respect to the direction of the normal to a substrate.

Techniques of the related art regarding the reflective liquid crystal display device are proposed in, for example, Japanese Unexamined Patent Application Publication Nos. Hei 11-174427 and 2001-5003.

At first, a first problem with the techniques of the related art will be described below. FIG. 1 shows a cross sectional photograph of a film structure of the transparent electrode substrate as an example of the structure of an alignment film by a scanning electron microscope. In the film structure, an ITO (Indium Tin Oxide) film as a transparent electrode is formed on a glass substrate, and a silicon oxide (SiO$_2$) film as an alignment film is formed directly on the ITO film through oblique evaporation. It is obvious from the cross sectional photograph that the silicon oxide film formed through oblique evaporation has a columnar structure which is inclined to the evaporation direction. Although it is considered that a vertical liquid crystal can be inclined at a pretilt angle by such a structure, as can be seen from the cross sectional photograph, in the structure, a large number of gaps exist, so the silicon oxide film is not exactly a dense film. Therefore, ions generated from an electrode during drive of a liquid crystal cell, ions existing in a liquid crystal cell, or ions or impurities generated in a liquid crystal cell by light easily pass through the silicon oxide film, so the silicon oxide film is a film with a relatively low resistance. The same goes for an alignment film on a pixel electrode substrate side.

Therefore, in the case where a liquid crystal cell is driven for a long time, ions are introduced into the liquid crystal cell, and the deviation of ions occurs in the liquid crystal cell, thereby resulting in so-called burn-in. In order to correct the deviation of ions, a technique of changing a thickness ratio between the alignment films on both sides of the liquid crystal or a technique of inserting a different dielectric layer so as to electrically correct electrical asymmetry generated by the deviation of ions, thereby reducing the deviation of ions can be considered. However, burn-in occurs because the alignment films formed through oblique evaporation are not dense, so the former technique produces little effect. Further, the latter technique is not practical, because a problem that new burn-in occurs in an interface between the dielectric layer and the alignment film may arise, or there are problems such as the need for forming a film made of another material in manufacturing.

In Japanese Unexamined Patent Application Publication No. Hei 11-174427, a device with a structure in which a layer made of a material different from that of an alignment film is formed between an electrode and the alignment film is described. In Japanese Unexamined Patent Application Publication No. Hei 11-174427, as a structure for preventing light reflection which occurs in an interface between a liquid crystal and a glass substrate, a technique regarding a liquid crystal display device with a laminate structure in which a transparent electrode layer, an alignment layer and one or a plurality of transparent middle layers with a refractive index which is lower than that of the transparent electrode layer and is higher than that of the liquid crystal layer or a glass substrate are laminated on an inner surface of the glass substrate is disclosed. As a specific example, a structure in which an $Al_2O_3$ film as a middle layer is formed on an ITO electrode film, and an obliquely evaporated film of $SiO_2$ as an alignment film is formed on the $Al_2O_3$ film is described.

However, the technique in Japanese Unexamined Patent Application Publication No. Hei 11-174427 is a technique for preventing light reflection from an optical standpoint, so the technique does not solve the problems such as passage of ions which are concerned with the invention. Moreover, the problems such as passage of ions occur in not only a transparent electrode substrate but also a pixel electrode substrate; however, the technique in Japanese Unexamined Patent Application Publication No. Hei 11-174427 is only for the transparent electrode substrate.

Next, a second problem with the techniques of the related art will be described below. In general, it is difficult to control the alignment of a vertically aligned liquid crystal material. In the case where there is an uneven structure on the drive substrate by the reflective pixel electrode or the case where a groove exists between pixel electrodes, an alignment defect occurs around the pixel electrode due to the uneven structure. The alignment defect causes a decline in uniformity of characteristics in a display surface, an increase in black level (a phenomenon in which a black portion of an image does not appear black but gray), degradation in image quality due to disclination. In particular, in a reflective liquid crystal display device using a silicon drive device, a pixel pitch is as small as 10 μm or less in general, so compared to a large direct-view-type liquid crystal device with a pixel pitch of a few tens of μm or more, a defective region around a pixel easily exerts an influence upon image quality, and unlike a transmissive liquid crystal display device, the defective region cannot be covered with a black matrix, so a basic practical requirement for the reflective liquid crystal display device is that a misalignment region must be minimized or completely eliminated.

A problem of a reflective liquid crystal display device due to the structure of a pixel electrode will be described in detail below. As shown in FIGS. 2A and 2B, reflective pixel electrodes 111 are arranged on a silicon drive substrate 110 in a matrix. The size and the shape of each of the reflective pixel electrodes 111 is, for example, a square 8.4 μm on a side. In order to prevent an electrical short circuit between adjacent pixels, the reflective pixel electrodes 111 are disposed so as to have an inter-pixel space W1 with a predetermined distance. When the inter-pixel space W1 is, for example, 0.6 μm, a pixel pitch W2 is 9 μm. In general, the pixel pitch W2 is within a range of approximately 7 μm to 15 μm, and the inter-pixel space W1 is within a range of approximately 0.3 μm to 0.7 μm. Further, the thickness of the pixel electrode is within a range of approximately 150 nm to 250 nm.

As each of the reflective pixel electrodes 111 has such a shape, a portion with a groove-like shape (hereinafter referred to as inter-pixel groove) is always formed between adjacent pixel electrodes. The inter-pixel groove has, for example, an aspect ratio of 150 nm high to 600 nm wide in a sectional surface shown in FIG. 2B.

FIGS. 3 and 4 schematically show a state where an alignment film 112 of silicon oxide is formed on a pixel structure shown in FIGS. 2A and 2B through oblique evaporation and a state of the alignment of a vertically aligned liquid crystal 113 by the alignment film 112. In FIGS. 3 and 4, an arrow 130 shows an evaporation direction where the alignment film 112 is formed. The alignment film 112 is obliquely evaporated on a substrate at, for example, an incident angle θ of 55° (refer to FIG. 3) with respect to the direction of the normal to a substrate surface from a diagonal direction of the reflective pixel electrodes 111 (refer to FIG. 4).

In the case where such oblique evaporation is performed, as shown in FIG. 3, an area around a side surface of the reflective pixel electrode 111 opposite to the incident direction (around a region 121 in FIG. 3) is shaded with the reflective pixel electrode 111, so the alignment film 112 is not evaporated and formed on the area. On the other hand, the alignment film 112 is formed in the shape of the letter L around a side surface on the other side, as shown in FIG. 3. Thus, the region 121 where no alignment film 112 is formed exists on a bottom surface of the inter-pixel groove and the side surface of the reflective pixel electrode 111.

The alignment direction of a pretilt is a diagonal direction of pixels, and FIG. 4 shows a schematic plan view of a region where the alignment film 112 is formed and the region 121 where the alignment film 112 is not formed in this case. When the thickness of the reflective pixel electrode 111 is increased, and the inter-pixel space W1 is reduced, no film is evaporated on the bottom surface of the inter-pixel groove, and the film is formed only on one side surface of the inter-pixel groove. In a typical method of forming an alignment film, it is inevitable that the film structures of both side surfaces of the inter-pixel groove become asymmetric.

Thus, as a region where the alignment film 112 is not formed specifically on the bottom surface of the inter-pixel groove exists, the alignment of the liquid crystal 113 cannot be controlled in the region, thereby the liquid crystal 113 goes out of alignment, and problems such as degradation in image quality such as nonuniform alignment and a decline in reliability arise. In other words, as shown in FIG. 3, the alignment film 112 is formed on a surface of the reflective pixel electrode 111, thereby the long axis of liquid crystal molecules is uniformly aligned in a pretilt direction in a good state in general. On the other hand, specifically the region 121 where the alignment film 112 is not formed is produced in a portion of the bottom surface of the inter-pixel groove, so a force to vertically align the liquid crystal molecules does not work, thereby a nonuniform alignment region 120 is produced. The nonuniform alignment region 120 exerts an influence upon an area around the pixel electrode, thereby resulting in a state where liquid crystal molecules on the surface of the pixel electrode are vertically aligned, but liquid crystal molecules in a region from an area around the pixel electrode to the inter-pixel groove are nonuniformly aligned. Thereby, nonuniform alignment occurs in the region from the area around the pixel electrode to the inter-pixel groove, so degradation in image quality is induced. The evaporation angle is generally selected within a range of 45° to 65° with respect to the direction of the normal to the substrate; however, the deeper the inter-pixel groove is, the larger the region where the alignment film 112 is not formed in the bottom surface of the inter-pixel groove becomes, so the evaporation angle has a large influence. The above phenomenon specifically occurs in the case where an obliquely evaporated film of an inorganic material such as silicon oxide is used as the alignment film 112.

On the other hand, in an organic alignment film such as polyimide, the above problems which arise because the alignment film 112 is not formed do not occur. It is because the organic alignment film is formed through coating the whole surface of the pixel substrate with a material in a solvent form by a technique such as spin coating, so the inter-pixel groove is overcoated with the material on average.

As a method for preventing such problems with the obliquely evaporated film, in Japanese Unexamined Patent Application Publication No. 2001-5003, a method in which at first, oblique evaporation is performed at an angle of 70° from the normal to a substrate surface along a side of a pixel electrode to form a first alignment film on a bottom surface portion (refer to as A) of an inter-pixel groove along the side of the pixel electrode, and then the substrate is rotated by 90° in a plane, and a second alignment film is formed on a bottom surface portion (refer to as B) of the inter-pixel groove along the other side of the pixel electrode through the same oblique evaporation is proposed.

The technique described in Japanese Unexamined Patent Application Publication No. 2001-5003 is a technique regarding a method of separately forming the first alignment film and the second alignment film through oblique evaporation from different incident direction in a substrate surface and an in-plane substrate rotation system for changing the evaporation direction in a plane. By the technique, an alignment film is surely formed on the bottom surface portion of the inter-pixel groove. However, the first alignment film and the second alignment film are formed from different directions (90° different in an example) in a plane, so the pretilt direction of the liquid crystal is different in the bottom surface portions A and B, so when a voltage is applied, liquid crystal molecules are inclined to different directions.

In other words, the second alignment film is formed on the surface of the pixel electrode, so most of liquid crystal molecules including liquid crystal molecules in a pixel groove portion B are inclined to a direction determined by the second alignment film. However, liquid crystal molecules in a pixel groove portion A on which the first alignment film is formed are inclined to a direction different from the above direction, so in a portion between them, that is, an area around the pixel groove portion A, a portion in which the alignment direction is locally different from an area around the portion is produced. The portion is very small, but it looks a periodic unevenness in alignment. Moreover, in the technique, as described above, the alignment film cannot be formed on the whole inter-pixel groove to be exact unless evaporation is performed along a side of the pixel electrode, and the substrate is rotated by 90° in a plane to perform evaporation again.

In general, in the reflective liquid crystal display device, as a polarization splitting device, a PBS (Polarization Beam Splitter) is used. When polarization is split in a cross Nicol arrangement by the PBS, the alignment direction of a vertical liquid crystal which can obtain the highest transmittance is diagonal to a pixel, that is, a 45° direction. Therefore, in the alignment along the side of the pixel in Japanese Unexamined Patent Application Publication No. 2001-5000, a polarization splitting optical system using the PBS cannot be used in the reflective liquid crystal display device, and the reflective liquid crystal display device has little practicability specifically as a projection display unit. In order to avoid the problem, when the second alignment film is formed in a direction diagonal to the pixel, in principle, even if the first alignment film is formed from any direction, a region which cannot be fully covered exists in the inter-pixel groove, so effects of the technique in Japanese Unexamined Patent Application Publication No. 2001-5003 are not exerted. Therefore, the technique is far from practically effective.

SUMMARY OF THE INVENTION

In view of the foregoing, it is a first object of the invention to provide a reflective liquid crystal display device capable of solving an electrical problem due to the structure of an obliquely evaporated alignment film while maintaining alignment characteristics by the obliquely evaporated alignment film, and preventing ions or the like from passing through an alignment film so as to achieve long-term reliability, a method of manufacturing the same, and a liquid crystal display unit.

Moreover, it is a second object of the invention to provide a reflective liquid crystal display device capable of preventing misalignment and nonuniform alignment due to the structure of an inter-pixel groove in the case where the alignment of a vertically aligned liquid crystal is controlled by an obliquely evaporated alignment film so as to achieve superior image quality, a method of manufacturing the same, and a liquid crystal display unit.

A reflective liquid crystal display device according to a first aspect of the invention, comprises: a pixel electrode substrate and a transparent electrode substrate facing each other with a vertically aligned liquid crystal in between, wherein in a side of each of the pixel electrode substrate and the transparent electrode substrate closer to the vertically aligned liquid crystal, at least a vertically evaporated film formed through evaporation from a vertical direction with respect to a substrate surface, and an obliquely evaporated alignment film formed on the vertically evaporated film through evaporation from an oblique direction with respect to the substrate surface are laminated in order.

In a method of manufacturing a reflective liquid crystal display device according to a first aspect of the invention, the reflective liquid crystal display device comprises a pixel electrode substrate and a transparent electrode substrate which face each other with a vertically aligned liquid crystal in between, wherein each of a step of manufacturing the pixel electrode substrate and a step of manufacturing the transparent electrode substrate comprises the steps of forming a vertically evaporated film in a side closer to the vertically aligned liquid crystal through evaporation from a vertical direction with respect to a substrate surface; and after forming the vertically evaporated film, forming an obliquely evaporated alignment film on the vertically evaporated film through evaporation from an oblique direction with respect to the substrate surface.

In a reflective liquid crystal display device, a method of manufacturing a reflective liquid crystal display device, and a liquid crystal display unit according to the invention, as a vertically evaporated film and an obliquely evaporated alignment film, for example, evaporated film made of, for example, silicon oxide are formed.

Moreover, the liquid crystal display unit according to the invention displays an image by using light modulated by the reflective liquid crystal display device according to the invention.

In the reflective liquid crystal display device, the method of manufacturing a reflective liquid crystal display device and the liquid crystal display unit according to the invention, in each of the pixel electrode substrate and the transparent electrode substrate, as a base layer of the obliquely evaporated alignment film, the vertically evaporated film is formed. For example, the vertically evaporated film made of silicon oxide does not have a columnar structure, and is a denser film with higher resistivity, compared to the obliquely evaporated alignment film, so the vertically evaporated film functions as an electrically shielding layer between the obliquely evaporated alignment film and each substrate. Thereby, the flow of ions which occurs in a device can be prevented. As a result, a device with superior long-term reliability in which no burn-in of ions occurs even in a long-term drive can be achieved. Moreover, specifically in the case where each evaporated film is formed of the same silicon oxide film, the obliquely evaporated alignment film made of the same silicon oxide is formed on the base film made of the same silicon oxide, so compared to the case where an alignment film is formed directly on an ITO electrode or an aluminum electrode, film quality can be superior.

The reflective liquid crystal display device according to the invention includes a two-layer alignment film in which the obliquely evaporated alignment film is formed on the vertically evaporated film, and in the method of manufacturing the two-layer alignment film, it is preferable that the vertically evaporated film and the obliquely evaporated alignment film are successively formed. The word "successively" herein means that without breaking vacuum, the films are formed in sequence. A method of forming two films with different apparatuses, or a method in which after forming one film and then breaking vacuum, the other film is formed can be used, thereby effects to some extent can be obtained. However, in this case, it is required to keep the interface between the films extremely clean. More specifically, for example, silicon oxide is susceptible to water absorption or adhesion of impurities, so chemical stability in the surface of the vertically evaporated film is important. If the chemical stability is not sufficient, the bonding strength between the films is low, so the films may be separated, or the film structures may not be successively connected, thereby ions or the like are trapped in the interface, thereby new burn-in may occur.

Therefore, it is the most effective that in each of a step of manufacturing the pixel electrode substrate and a step of manufacturing the transparent electrode substrate, one evaporation apparatus with a system which can change the incident angle of evaporation particles with respect to the direction of the normal to a substrate to successively evaporate two films without breaking vacuum, so it is preferable as an efficient manufacturing method.

A reflective liquid crystal display device according to a second aspect of the invention comprises: a pixel electrode substrate and a transparent electrode substrate facing each other with a vertically aligned liquid crystal in between, wherein in a side of the pixel electrode substrate facing the transparent electrode substrate, at least a plurality of reflective pixel electrodes, a vertically evaporated film formed on the whole surfaces of the reflective pixel electrodes and the whole groove portion between adjacent reflective pixel electrodes through evaporation from a vertical direction with respect to the substrate surface of the pixel electrode substrate, and an obliquely evaporated alignment film formed on the whole top surfaces of the reflective pixel electrodes and a part of the groove portion between adjacent reflective pixel electrodes with the vertically evaporated film in between through evaporation from an oblique direction with respect to the substrate surface of the pixel electrode substrate are laminated in order.

In a method of manufacturing a reflective liquid crystal display device according to a second aspect of the invention, the reflective liquid crystal display device comprises a pixel electrode substrate including a plurality of reflective pixel electrodes and a transparent electrode substrate including a transparent electrode which face each other with a vertically aligned liquid crystal in between, and the method comprises the steps of: forming a vertically evaporated film on the top surfaces of the reflective pixel electrodes and a groove portion between adjacent pixel electrodes in a side of the pixel electrode substrate facing the transparent electrode substrate through evaporation from a vertical direction with respect to the substrate surface of the pixel electrode substrate; and after forming the vertically evaporated film, forming an obliquely evaporated alignment film on the top surfaces of the reflective pixel electrodes and the groove portion between adjacent reflective pixel electrodes with the vertically evaporated film in between through evaporation from an oblique direction with respect to the substrate surface of the pixel electrode substrate.

In the reflective liquid crystal display device and the liquid crystal display unit according to the invention, the obliquely evaporated alignment film is formed on the whole top surfaces of the pixel electrodes with the vertically evaporated film in between, so liquid crystal molecules having, for example, a very small pretilt angle of approximately 1° to 5° are aligned in an evaporation direction (in a 45° diagonal direction of a device, in general) during the application of a voltage. In the inter-pixel groove, in an region where the obliquely evaporated alignment film is formed, liquid crystal molecules are aligned in a state where the liquid crystal molecules has a pretilt angle in a like manner. On the other hand, in a region where the obliquely evaporated alignment film is not formed, liquid crystal molecules are perfectly aligned in a vertical direction with respect to a substrate surface.

In a region of the inter-pixel groove where the obliquely evaporated alignment film is not formed, the alignment is not vertical and nonuniform, so the region has an adverse influence on the alignment of the vertically aligned liquid crystal on the pixel electrode. On the other hand, in the invention, in the region, the liquid crystal is aligned in a vertical direction by the vertically evaporated film, so the region had no adverse influence on the vertical alignment of the liquid crystal on the pixel electrode. Moreover, the alignment of the liquid crystal by the vertically evaporated film is slightly different from the alignment of the liquid crystal by the obliquely evaporated alignment film, because the pretilt angle is formed in the alignment of the liquid crystal by the obliquely evaporated alignment film. However, in general, the pretilt angle is as small as 1° to 5°, so a difference in alignment cannot be recognized as a display image quality at all. Therefore, in the invention, misalignment around the inter-pixel groove which occurs in the device does not occur, and vertical alignment can be stably achieved throughout the whole display region. Thereby, superior image quality can be achieved.

In the method of manufacturing a reflective liquid crystal display device according to the invention, the vertically evaporated film is formed on the top surfaces of the reflective pixel electrodes and a groove portion between adjacent reflective pixel electrodes (inter-pixel groove) in a side of the pixel electrode substrate facing the transparent electrode substrate through evaporation from a vertical direction with respect to a substrate surface of the pixel electrode substrate, and after that, the obliquely evaporated alignment film is formed through evaporation from an oblique direction with respect to the substrate surface. The vertically evaporated film is evaporated from a vertical direction with respect to the substrate surface, so the vertically evaporated film is formed on the whole top surfaces of the reflective pixel electrodes and the whole bottom surface of the inter-pixel groove. The obliquely evaporated alignment film is evaporated from an oblique direction with respect to the substrate surface, so the obliquely evaporated alignment film is formed on the whole top surfaces of the reflective pixel electrodes and a part of the inter-pixel groove with the vertically evaporated film in between.

Unlike a manufacturing method of the related art, the reflective liquid crystal display device manufactured in the invention, in a region of the inter-pixel groove where the obliquely evaporated alignment film is not formed, the liquid crystal is aligned in a vertical direction by the vertically evaporated film, so the region hardly affects the vertical alignment of the liquid crystal on the pixel electrode. Therefore, in the reflective liquid crystal display device manufactured in the invention, misalignment around the inter-pixel groove which occurs in the device does not occur, and vertical alignment can be stably achieved throughout the whole display region. Thereby, superior image quality can be achieved.

In the method of manufacturing a reflective liquid crystal display device according to the invention, it is preferable that the vertically evaporated film and the obliquely evaporated alignment film are successively formed. The word "successively" herein means that without breaking vacuum, the films are formed in sequence. A method of forming two films with different apparatuses, or a method in which after forming one film and then breaking vacuum, the other film is formed can be used. However, in this case, degradation in characteristics or a decline in bonding strength due to water absorption or adhesion of impurities in an interface between the films must be prevented.

Therefore, it is preferable that, for example, in one evaporation apparatus, the direction of the normal to the substrate surface and the incident direction of an evaporation material from an evaporation source are adjusted to be in agreement with each other, and the vertically evaporated film is formed in a vacuum, and after that, while maintaining vacuum, the pixel electrode substrate is inclined so that the direction of the normal to the substrate surface forms a predetermined angle with respect to the incident direction of the evaporation material, thereby the obliquely evaporated alignment film is successively formed through evaporation from an oblique direction with respect to the substrate surface.

In the reflective liquid crystal display device and the liquid crystal display unit according to the first aspect of the invention, in a side of each of the pixel electrode substrate and the transparent electrode substrate closer to the vertically aligned liquid crystal, at least a vertically evaporated film formed through evaporation from a vertical direction with respect to a substrate surface, and an obliquely evaporated alignment film formed on the vertically evaporated film through evaporation from an oblique direction with respect to the substrate surface are laminated in order, so while maintaining alignment characteristics by the obliquely evaporated alignment film, an electrical problem due to the film structure can be solved, and ions or the like can be prevented from passing through the alignment film so as to achieve long-term reliability.

In the method of manufacturing a reflective liquid crystal display device according to the first aspect of the invention, each of a step of manufacturing the pixel electrode substrate and a step of manufacturing the transparent electrode substrate comprises the steps of forming a vertically evaporated film in a side closer to the vertically aligned liquid crystal through evaporation from a vertical direction with respect to a substrate surface; and after forming the vertically evaporated film, forming an obliquely evaporated alignment film on the vertically evaporated film through evaporation from an oblique direction with respect to the substrate surface, so a reflective liquid crystal display device in which while maintaining alignment characteristics by the obliquely evaporated alignment film, an electrical problem due to the film structure can be solved, and ions or the like can be prevented from passing through the alignment film so as to achieve long-term reliability can be manufactured.

In the reflective liquid crystal display device and the liquid crystal display unit according to the second aspect of the invention, the vertically evaporated film is formed on the whole top surfaces of the reflective pixel electrodes and the whole bottom surface of a groove portion between adjacent reflective pixel electrodes through evaporation, and the obliquely evaporated alignment film is formed on the whole top surfaces of the reflective pixel electrode and a part of the groove portion between the adjacent reflective pixel electrodes with the vertically evaporated film in between through evaporation from an oblique direction with respect to the substrate surface of the pixel electrode substrate, so in a region of the groove portion between the adjacent reflective pixel electrodes where the obliquely evaporated alignment film is not formed, the liquid crystal is aligned in a vertical direction by the vertically evaporated film. Thereby, in the case where the alignment of the vertically aligned liquid crystal is controlled by the obliquely evaporated alignment film, misalignment and nonuniform alignment due to the structure of the inter-pixel groove can be prevented, and superior image quality can be achieved.

In the method of manufacturing a reflective liquid crystal display device according to the second aspect of the invention, the vertically evaporated film is formed on the top surfaces of the reflective pixel electrodes and a groove portion between adjacent reflective pixel electrodes in a side of the pixel electrode substrate facing the transparent electrode substrate through evaporation from a vertical direction with respect to a substrate surface of the pixel electrode substrate, and after that, the obliquely evaporated alignment film is formed through evaporation from an oblique direction with respect to the substrate surface, so the vertically evaporated film can be formed on the whole top surfaces of the reflective pixel electrodes and the whole bottom surface of the inter-pixel groove, and the obliquely evaporated alignment film can be formed on the whole top surfaces of the reflective pixel electrodes and a part of the inter-pixel groove with the vertically evaporated film in between. Thereby, the reflective liquid crystal display device in which in a region of the groove portion between the adjacent reflective pixel electrodes where the obliquely evaporated alignment film is not formed, the liquid crystal is aligned in a vertical direction by the vertically evaporated film can be manufactured. According to the manufacturing method, in the case where the alignment of the vertically aligned liquid crystal is controlled by the obliquely evaporated alignment film, a reflective liquid crystal display device capable of preventing misalignment and nonuniform alignment due to the structure of the inter-pixel groove, and achieving superior image quality can be manufactured.

Specifically in the liquid crystal display unit according to the invention, the reflective liquid crystal display device according to the invention is used to display an image, so an image with superior image quality can be displayed.

Other and further objects, features and advantages of the invention will appear more fully from the following description.

BRIEF DESCRIPTION OF THE DRAWINGS

These and other objects and features of the present invention will become clear from the following description of the preferred embodiments given with reference to the accompanying drawings, in which:

FIG. 12 is a table showing results of observing the occurrence of burn-in in the reflective liquid crystal display device according to the embodiment of the invention and the reflective liquid crystal display device of the related art; and FIG. 13 is a table showing results of observing the occurrence of misalignment in the reflective liquid crystal display device according to the embodiment of the invention and the reflective liquid crystal display device of the related art.

DETAILED DESCRIPTION OF THE PREFERRED EMBODIMENTS

Preferred embodiments of the present invention will be described in more detail below referring to the accompanying drawings.

<Description of Reflective Liquid Crystal Display Device>

Figure 5:
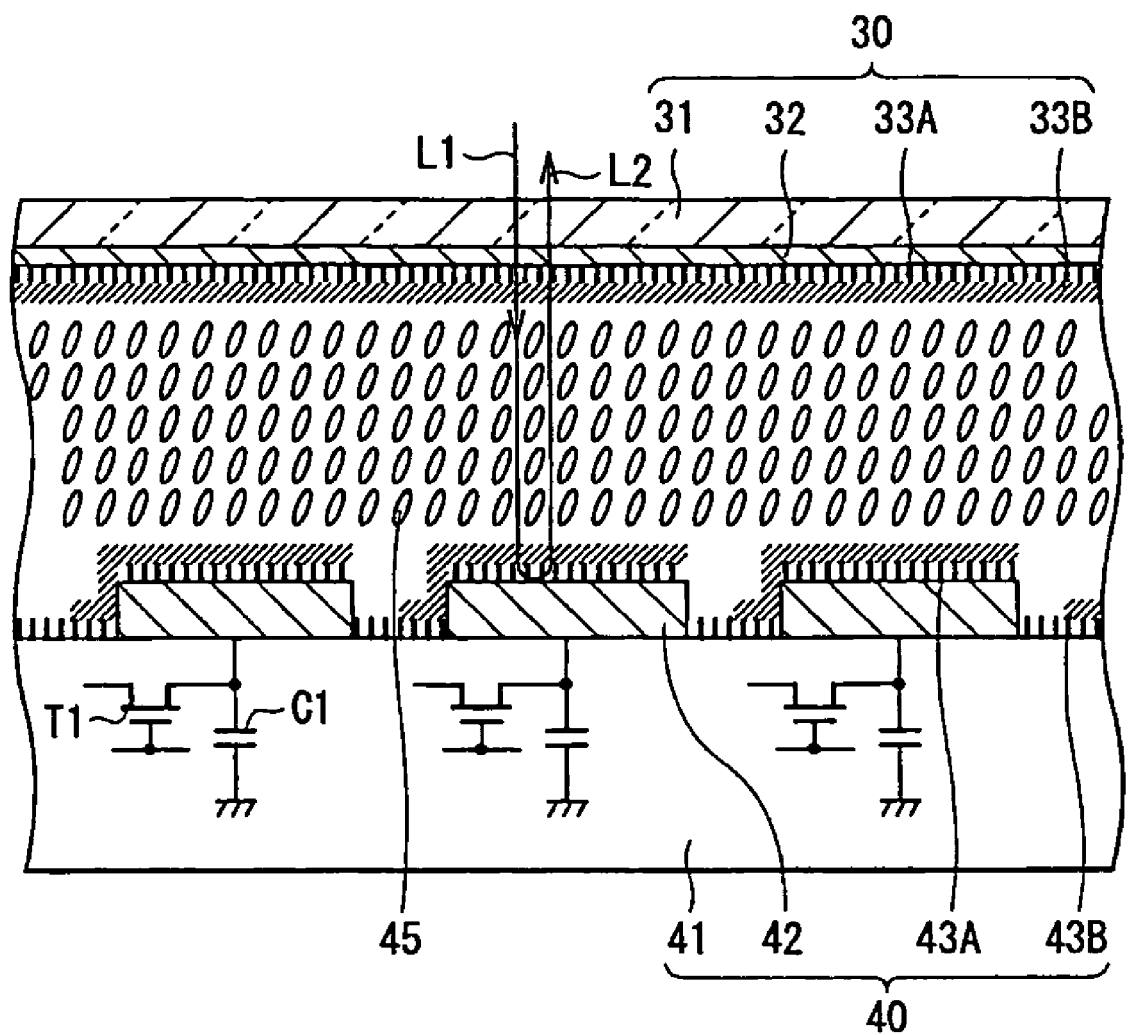
FIG. 5 is a sectional view of the whole structure of a reflective liquid crystal display device according to an embodiment of the invention.

FIG. 5 shows the whole structure of a reflective liquid crystal display device according to an embodiment of the invention. The reflective liquid crystal display device comprises a transparent electrode substrate 30 and a pixel electrode substrate 40 which face each other, and a vertically aligned liquid crystal 45 injected between these substrates 30 and 40.

The transparent electrode substrate 30 includes a glass substrate 31, and a transparent electrode 32 laminated on a surface of the glass substrate 31 on a side closer to the vertically aligned liquid crystal 45 (on a surface facing the pixel electrode substrate 40). A vertically evaporated film 33A and an obliquely evaporated alignment film 33B are laminated on the whole surface of the transparent electrode 32 on a side closer to the vertically aligned liquid crystal 45. As the transparent electrode 32, an electrode material with a function of transmitting light, generally ITO (Indium Tin Oxide) which is a solid solution material of tin oxide ($SnO_2$) and indium oxide ($In_2O_3$) is used. A common potential (for example, a ground potential) is applied to the transparent electrode 32 in the whole pixel region.

The vertically evaporated film 33A is formed through evaporation from a vertical direction with respect to a substrate surface of the transparent electrode substrate 30. The obliquely evaporated alignment film 33B is formed through evaporation from an oblique direction with respect to the substrate surface of the transparent electrode substrate 30, and is laminated on the whole top surface of the transparent electrode 32 with the vertically evaporated film 33A in between.

As the obliquely evaporated alignment film 33B, for example, an obliquely evaporated film of, for example, silicon oxide typified by silicon dioxide ($SiO_2$) is used. In this case, the pretilt angle of the vertically aligned liquid crystal 45 is controlled by changing the evaporation angle during oblique evaporation. In general, the evaporation angle θ is approximately 45° to 65° with respect to the direction of the normal to a substrate.

The pixel electrode substrate 40 includes, for example, a single-crystal silicon substrate 41, and a reflective pixel electrode 42, a vertically evaporated film 43A and an obliquely evaporated alignment film 43B which are laminated in order on a surface of the silicon substrate 41 on a side closer to the vertically aligned liquid crystal 45 (a surface facing the transparent electrode substrate 30). In the silicon substrate 41, an active drive circuit including a transistor T1 such as CMOS or NMOS and a capacitor (auxiliary capacitor) C1 is formed.

A plurality of the reflective pixel electrodes 42 are formed in a matrix on the silicon substrate 41. Each of the reflective pixel electrodes 42 is made of a metal film typified by aluminum (Al) or silver (Ag). In the case where a metal electrode such as an aluminum electrode is used as the reflective pixel electrode 42, the reflective pixel electrode 42 has a function as a light reflective film and a function as an electrode which applies an voltage to a liquid crystal, and in order to further increase reflectivity, a reflective layer of a multilayer film such as a dielectric mirror may be formed on the aluminum electrode or the like. Moreover, a film of an oxide or a nitride may be laid over the aluminum electrode or the like so as to protect the whole surface of the aluminum electrode or the like.

Figure 7:
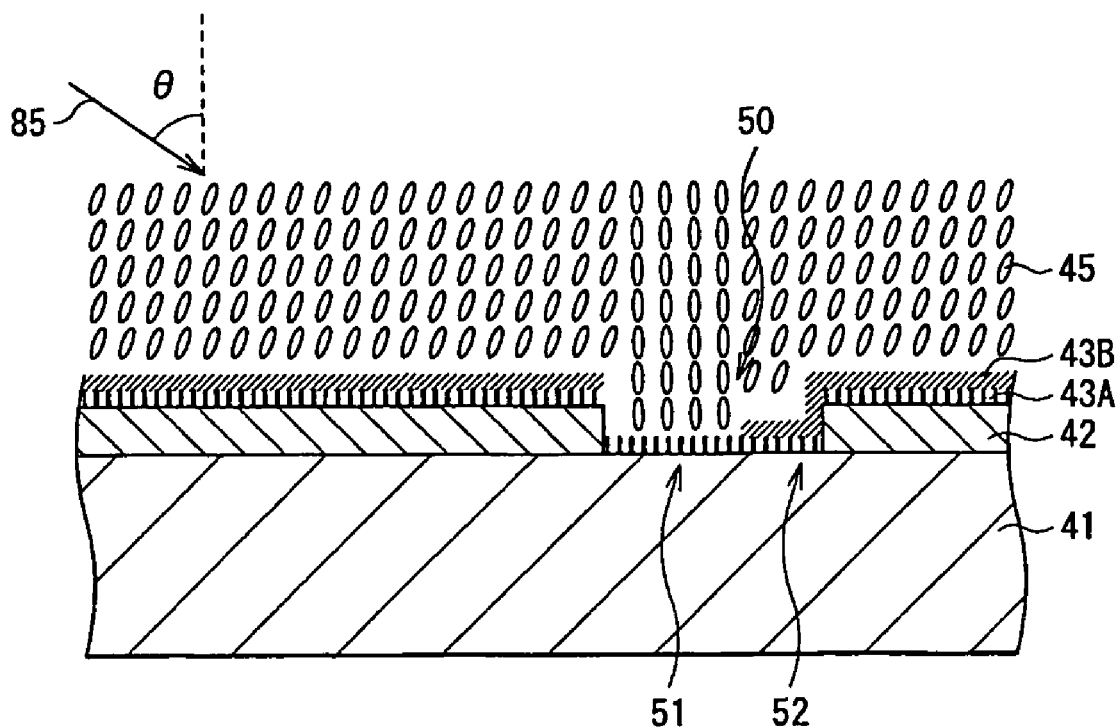
FIG. 7 is a schematic sectional view showing a pixel electrode substrate of the reflective liquid crystal display device shown in FIG. 5 around an inter-pixel groove and an alignment state of a vertically aligned liquid crystal.

FIG. 7 schematically shows the structure of the pixel electrode substrate 40 around an inter-pixel groove (a groove portion between adjacent pixel electrodes) 50 and an alignment state of the vertically aligned liquid crystal 45. In FIG. 7, an arrow 85 indicates an evaporation direction of the obliquely evaporated alignment film 43B. The vertically evaporated film 43A is formed through evaporation in a vertical direction with respect to a substrate surface of the pixel electrode substrate 40, and is laminated on the whole top surface of the reflective pixel electrode 42 and the whole bottom surface of the inter-pixel groove 50. The obliquely evaporated alignment film 43B is formed through evaporation in an oblique direction with respect to the substrate surface of the pixel electrode substrate 40, and is laminated on the whole top surface of the reflective pixel electrode 42 and a region 52 of the inter-pixel groove 50 with the vertically evaporated film 43A in between.

The most characteristic part of the embodiment is that in the transparent electrode substrate 30 and the pixel electrode substrate 40, the vertically evaporated films 33A and 43A are formed under the obliquely evaporated alignment films 33B and 43B, respectively.

As the vertically evaporated films 33A and 43A and the obliquely evaporated alignment films 33B and 43B, evaporated films of silicon oxide typified by silicon dioxide ($SiO_2$) are used. In this case, the pretilt angle of the vertically aligned liquid crystal 45 is controlled by changing the evaporation angle when the obliquely evaporated alignment films 33B and 43B are obliquely evaporated. In general, the evaporation angle $\theta$ is approximately 45° to 65° with respect to the direction of the normal to a substrate.

In the vertically aligned liquid crystal 45 used in the reflective liquid crystal display device, the long axis of the molecules of the vertically aligned liquid crystal 45 is aligned in a substantially vertical direction with respect to each substrate surface when an applied voltage is zero, and when a voltage is applied, the long axis is inclined in a in-plane direction, thereby the transmittance of the vertically aligned liquid crystal 45 changes. If the directions where the liquid crystal molecules are inclined are not uniform during drive, the contrast becomes uneven. In order to prevent uneven contrast, it is required to align liquid crystal molecules at a very small pretilt angle in a predetermined direction (in a diagonal direction of a device, in general) in advance, then vertically align them. When the pretilt angle is too large, vertical alignment is degraded, thereby a black level is increased, and the contrast declines. Therefore, in general, the pretilt angle is controlled within a range from approximately 1° to 5° by the obliquely evaporated alignment films 33B and 43B.

Figure 6:
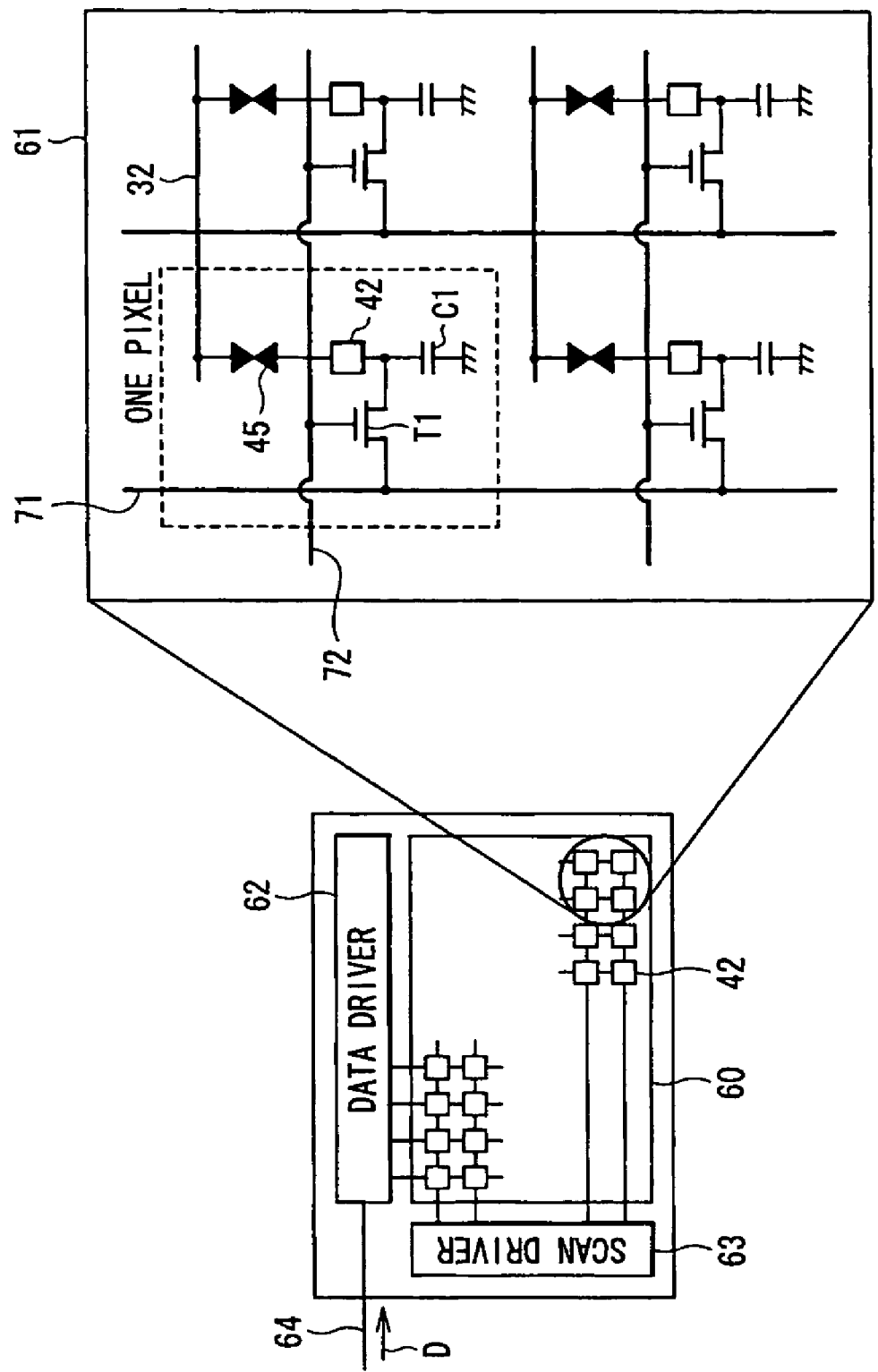
FIG. 6 is an illustration showing the structure of a drive circuit of the reflective liquid crystal display device according to the embodiment of the invention.

FIG. 6 shows the structure of a drive portion of the reflective liquid crystal display device. The drive portion includes a pixel drive circuit 61 formed in each pixel and a logic portion such as a data driver 62 and a scan driver 63 which is disposed around a display region 60. Image signals D from outside are inputted into the data driver 62 through a signal line 64. The pixel drive circuit 61 is formed under each reflective pixel electrode 42, and includes a switching transistor T1 and the auxiliary capacitor C1 which supplies a voltage to the liquid crystal. The transistor T1 is required to have a withstand voltage corresponding to a drive voltage of the vertically aligned liquid crystal 45, so in general, the transistor T1 is formed by a higher withstand voltage process than the logic portion.

In the pixel drive circuit 61, a plurality of data lines 71 are arranged in a column direction and a plurality of scanning lines 72 are arranged in a line direction. An intersection of each data line 71 and each scanning line 72 corresponds to one pixel. A source electrode of each transistor T1 is connected to the data line 71, and a gate electrode of the transistor T1 is connected to the scanning line 72. A drain electrode of each transistor T1 is connected to each reflective pixel electrode 42 and the auxiliary capacitor C1. Each data line 71 is connected to the data driver 62, and image signals are supplied from the data driver 62. Each scanning line 72 is connected to the scan driver 63, and scanning signals are successively supplied from the scan driver 63. Moreover, a common potential (for example, a ground potential) is applied to the transparent electrode 32 in the whole pixel region.

Next, a method of manufacturing the reflective liquid crystal display device will be described below. A characteristic part of the reflective liquid crystal display device is the structures of the vertically evaporated films 33A and 43A and the obliquely evaporated alignment films 33B and 43B in the transparent electrode substrate 30 and the pixel electrode substrate 40, so specifically a method of forming them will be described in detail. Moreover, the methods of forming these films in the transparent electrode substrate 30 and the pixel electrode substrate 40 are basically the same, so a method of forming films in the pixel electrode substrate 40 will be described below.

FIGS. 9A and 9B show a vacuum evaporation apparatus used for forming these films. FIG. 5B shows the vacuum evaporation apparatus of FIG. 5A viewed from an X1 direction in the drawing. After the silicon substrate 41 on which the reflective pixel electrode 42 as the pixel electrode substrate 40 is formed is cleaned, the pixel electrode substrate 40 is introduced into the vacuum evaporation apparatus 80. The reflective pixel electrode 42 is formed, for example, through forming a metal film such as aluminum on the silicon substrate 41, and then processing the metal film on the silicon substrate 41 into a square by using a photolithography technique in a semiconductor process.

As the vacuum evaporation apparatus 80, a vacuum evaporation apparatus including, for example, a substrate rotation system is used so that the incident direction of evaporation particles 83 with respect to the normal to a substrate can be changed. During film formation, vacuum is maintained in the vacuum evaporation apparatus 80. In the vacuum evaporation apparatus 80 including such a substrate rotation system, at first, the direction of the normal to the substrate surface of the pixel electrode substrate 40 and the incident direction of the evaporation particles 83 from the evaporation source 81 are adjusted to be in agreement with each other (in a first evaporation position), and the vertically evaporated film 43A is formed from a vertical direction with respect to the substrate surface. As the evaporation particle 83, for example, silicon oxide is used. The vertically evaporated film 43A is evaporated from a vertical direction with respect to the substrate surface, so as shown in FIG. 7, the vertically evaporated film 43A is formed on the whole top surface of the reflective pixel electrode 42 and the whole bottom surface of the inter-pixel groove 50.

After that, in a state where vacuum is maintained, the pixel electrode substrate 40 is rotated by an angle θ to be inclined (to a second evaporation position) so that the direction of the normal to the substrate surface forms a predetermined angle θ with respect to the incident direction of the evaporation particles 83, thereby the obliquely evaporated alignment film 43B is formed through evaporation from an oblique direction with respect to the substrate surface. As the evaporation source 81, the same source as that used when the vertically evaporated film 43A is formed is used, and as the evaporation particle 83, as in the case of the vertically evaporated film 43A, for example, silicon oxide is used. Thus, the obliquely evaporated alignment film 43B is formed through oblique evaporation at an incident angle θ of, for example, 45° to 65° with respect to the direction of the normal to the substrate surface. An in-plane incident direction is the diagonal direction of a pixel as in the case of a reflective liquid crystal display device of the related art, and the pretilt angle of liquid crystal molecules is designed so as to be approximately 1° to 5°. The obliquely evaporated alignment film 43B is evaporated from an oblique direction with respect to the substrate surface, so as shown in FIG. 7, the obliquely evaporated alignment film 43B is formed on the whole top surface of the reflective pixel electrode 42 and a region 52 of the inter-pixel groove 50 with the vertically evaporated film 43A in between. In a region 51 where the obliquely evaporated alignment film 43B is not formed in the inter-pixel groove 50, the vertically evaporated film 43A comes in contact with a liquid crystal.

In the transparent electrode substrate 30, the transparent electrode 32 is formed on the whole substrate surface, so the vertically evaporated film 33A is formed all over the transparent electrode 32. Then, the obliquely evaporated alignment film 33B is formed all over the vertically evaporated film 33A.

As described above, it is preferable that the vertically evaporated film 43A and the obliquely evaporated alignment film 43B are successively formed in one vacuum evaporation apparatus 80. The word "successively" herein means that without breaking vacuum, the films are formed in sequence. A method of forming the vertically evaporated film 43A and the obliquely evaporated alignment film 43B with different apparatuses, or a method in which after forming the vertically evaporated film 43A, the vacuum is broken, and then the obliquely evaporated alignment film 43B is formed can be used, thereby effects to some extent can be obtained. However, in this case, it is required to keep the interface between the vertically evaporated film 43A and the obliquely evaporated alignment film 43B extremely clean. More specifically, for example, silicon oxide is susceptible to water absorption or adhesion of impurities, so chemical stability in the surface of the vertically evaporated film 43A is important. If the chemical stability is not sufficient, the bonding strength between the films is low, so the films may be separated, or the film structures may not be successively connected, thereby ions or like are trapped in the interface, thereby new burn-in may occur.

Figure 10:
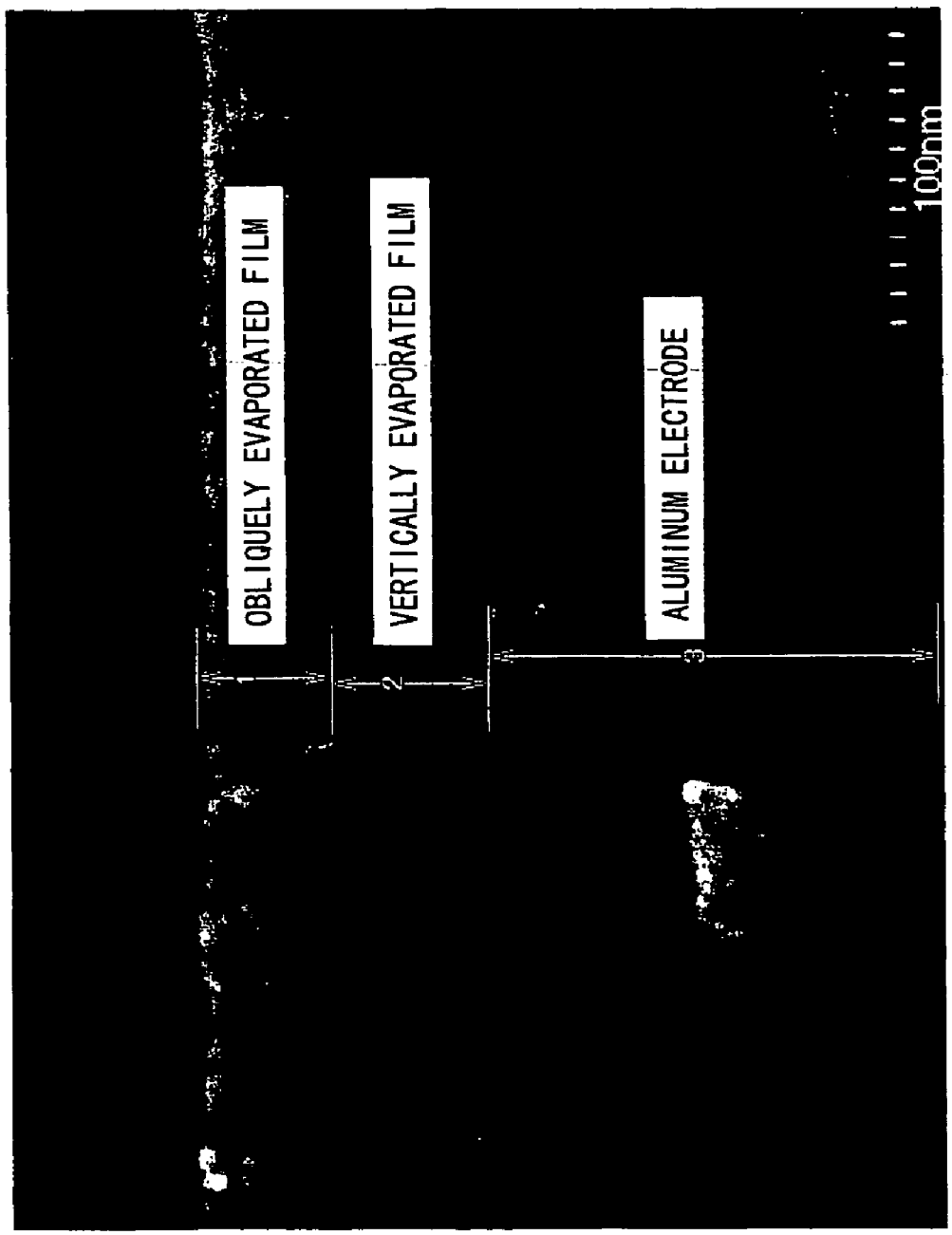
FIG. 10 is a cross sectional photograph of a film structure of a pixel electrode substrate which has been actually formed.

FIG. 10 shows a cross sectional photograph of a film structure which has been actually formed through the above method. In the film structure, a vertically evaporated film of silicon oxide and an obliquely evaporated film of silicon oxide are formed on an aluminum electrode as the reflective pixel electrode 42. The films are successively formed without breaking vacuum, so it is obvious from the photograph that no problem such as water absorption occurs in the surface of the vertically evaporated film, and the obliquely evaporated film is formed in a state where the continuity of the films is very good.

According to the method, as shown in FIG. 10, an alignment film with a series of structures from the vertically evaporated film to the obliquely evaporated film is formed. The alignment film is a silicon oxide alignment film in which a vertical base film and the obliquely evaporated film are combined, and the alignment film is completely different from a structure including only an obliquely evaporated film.

In the case where the vertically evaporated film 43A and the obliquely evaporated alignment film 43B are successively formed, as shown in FIGS. 9A and 9B, it is preferable that a shutter 82 is disposed between the evaporation source 81 and the position where a substrate is set, and the shutter 82 is opened or closed in synchronization with the substrate rotation system (not shown). More specifically, after the vertically evaporated film 43A is formed in a state where the shutter 82 is opened, the shutter 82 is closed to block the evaporation particles 83 temporarily. During that, the substrate is rotated by the substrate rotation system, and the shutter 82 is opened again to form the obliquely evaporated alignment film 43B. Thus, it is preferable but not necessary that the evaporation particles 83 are temporarily blocked with the shutter 82 or the like to form the obliquely evaporated alignment film 43B. A method without using the shutter 82 in which while vertical evaporation is performed, the substrate is rotated at some midpoint to shift oblique evaporation without interruption can be used.

Through the above method of manufacturing the film, in the transparent electrode substrate 30 and the pixel electrode substrate 40, the obliquely evaporated alignment films 33B and 43B are successively formed with the vertically evaporated films 33A and 43A in between, respectively. Specifically in the pixel electrode substrate 40, the obliquely evaporated alignment film 43B is formed on the whole top surface of the reflective pixel electrode 42 with the vertically evaporated film 43A in between, and in the inter-pixel groove 50, the obliquely evaporated alignment film 43B are partially formed with vertically evaporated film 43A in between. Functions and effects which can be obtained by these film structures will be described later.

The vertically evaporated film 33A and 43A which are formed under the obliquely evaporated alignment films 33B and 43B in advance, respectively, preferably have a thickness of 10 nm or more, because if the thickness is too thin, a good quality film with high density and high resistivity cannot formed. The upper limit of the thickness is preferably 500 nm or less, because if the thickness is too thick, film formation time is longer, so the film quality and practicability decline. More preferably, a thickness specifically suitable for practical use is 30 nm to 100 nm.

Although the case where the vertically evaporated film 43A and the obliquely evaporated alignment film 43B are laminated in order directly on the reflective pixel electrodes 42 is described above, a structure in which another film is disposed on the reflective pixel electrodes 42, and the vertically evaporated film 43A and the obliquely evaporated alignment film 43B are laminated in order on the film may be applied. For example, in the case where an aluminum electrode is used as the reflective pixel electrode 42, the surface of the aluminum electrode is chemically unstable, so there may be cases where the whole pixel electrode is covered with a protective film called a passivation film generally made of oxide or nitride. In this case, the structure of the alignment film according to the embodiment is effective.

FIG. 10 shows an example of a film structure in which the passivation film is laminated. A passivation film 44 is formed through a film formation technique such as CVD (Chemical Vapor Deposition) in, for example, a LSI process, and the whole top surfaces of the pixel electrodes 42, the side surfaces and the bottom surface of the inter-pixel groove 50 are overcoated substantially uniformly with the passivation film 44. As in the case of the film structure shown in FIG. 9, the vertically evaporated film 43A and the obliquely evaporated alignment film 43B may be laminated in order on the passivation film 44.

In addition, in order to further improve the reflectivity of the reflective pixel electrode 42, there may be cases that a dielectric mirror made of a laminate film including oxide films or nitride films with different refractive indexes is disposed on the electrode. In this case, the structure of the alignment film according to the embodiment is effective.

Next, functions and actions of the reflective liquid crystal display device formed as described above will be described below.

In the reflective liquid crystal display device, incident light L1 entering from the transparent electrode substrate 30 and passing through the vertically aligned liquid crystal 45 is reflected by a reflection function of the reflective pixel electrode 42. The light L1 reflected by the reflective pixel electrode 42 passes through the vertically aligned liquid crystal 45 and the transparent electrode substrate 30 to an opposite direction to a direction where the light is entered so as to be emitted. At this time, the optical characteristics of the vertically aligned liquid crystal 45 are changed according to a potential difference between facing electrodes, thereby the light L1 passing through the vertically aligned liquid crystal 45 is modulated. Therefore, by the light modulation, gray levels can be produced, and modulated light L2 is used for image display.

A voltage is applied to the vertically aligned liquid crystal 45 by the pixel drive circuit 61 shown in FIG. 6. The data driver 62 provides image signals to the data line 71 according to the image signals D from outside which are inputted through the signal line 64. The scan driver 63 successively provides scanning signals to each scanning line 72 with predetermined timing. Thereby, pixels in a portion where the scanning signals from the scanning line 72 scan and the image signals from the data line 71 are applied are selectively driven.

In the reflective liquid crystal display device, the vertically evaporated films 33A and 43A as base films of the obliquely evaporated alignment films 33B and 43B are formed in the transparent electrode substrate 30 and the pixel electrode substrate 40, respectively, so the following functions and the following effects can be obtained.

For example, the vertically evaporated films 33A and 43A made of silicon oxide does not have a columnar structure and have a high density and high resistivity, compared to the obliquely evaporated alignment films 33B and 43B made of the same silicon oxide. Therefore, the vertically evaporated films 33A and 43A function as electrically shielding layers between the obliquely evaporated alignment films 33B and 43B and each substrate. Thereby, the flow of ions through the alignment film which occurs in a device can be prevented. As a result, a device with superior long-term reliability in which no burn-in of ions occurs even in a long-term drive can be achieved.

Moreover, specifically in the case where the vertically evaporated films 33A and 43A and the obliquely evaporated alignment films 33B and 43B are formed of the same silicon oxide, the obliquely evaporated alignment films 33B and 43B of silicon oxide are formed on the base films made of the same silicon oxide, so compared to the case where an alignment film is formed directly on an ITO electrode or an aluminum electrode, higher film quality can be obtained. Further, in the device of the related art, in order to sufficiently exert an alignment control force, the alignment film is required to have a thickness of 40 nm or more. However, in the film structure according to the embodiment, even if the obliquely evaporated alignment films 33B and 43B have a thickness of 30 nm, a sufficient alignment control force can be obtained.

Figure 9:
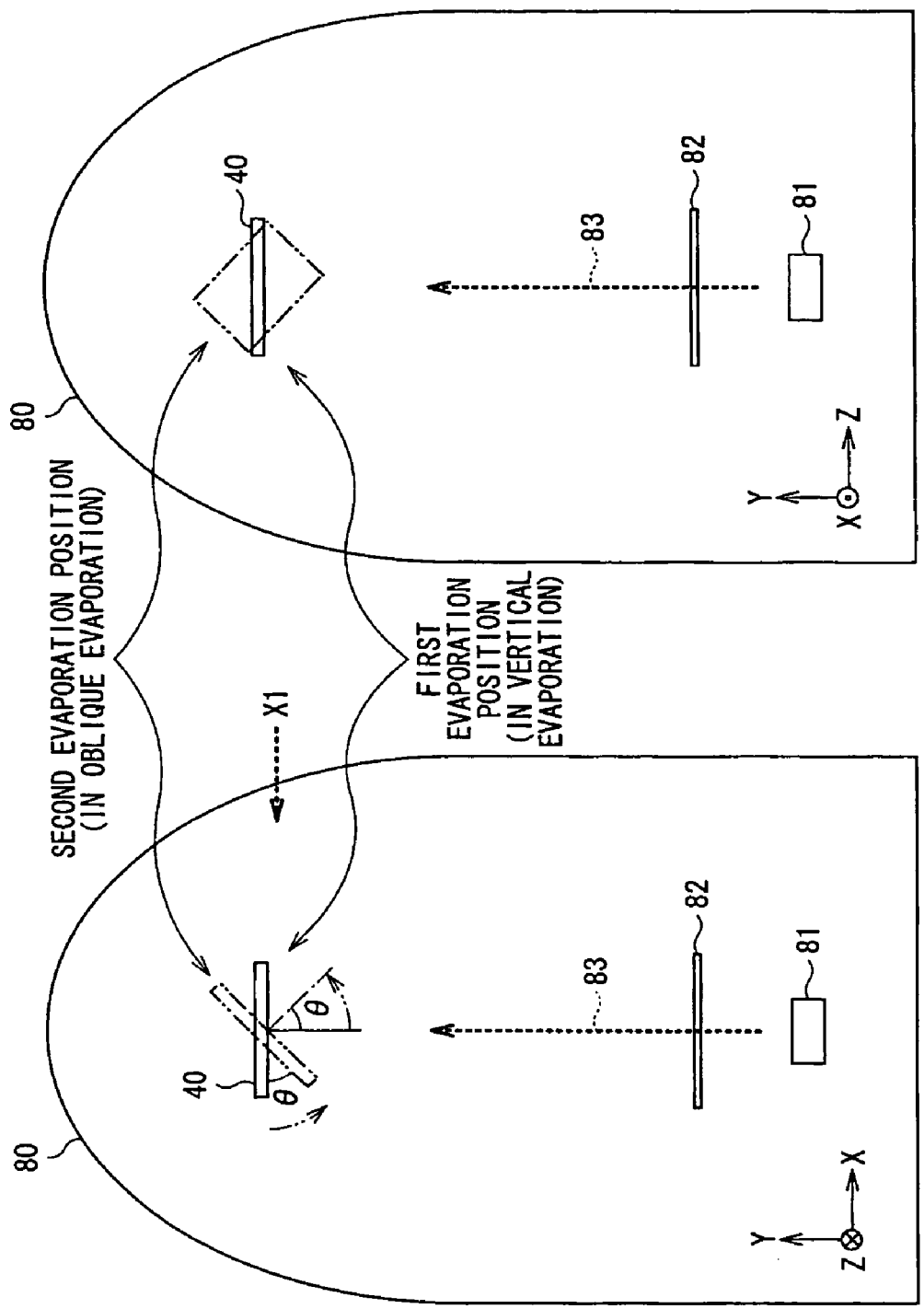
FIGS. 9A and 9B are illustrations of an example of an apparatus for forming an evaporated film.

Moreover, in the evaporation apparatus shown in FIG. 9, the films are successively formed without breaking vacuum, so no problem such as water absorption occurs in the surfaces of the vertically evaporated films 33A and 43A, thereby the obliquely evaporated alignment films 33B and 43B can be formed in a state where the continuity of the films is very good. By the continuity of the films, a problem that ions or like are trapped in the interfaces between the films does not occur at all. Further, as shown in the cross sectional photograph of FIG. 10, the vertically evaporated films 33A and 43A are dense films without a columnar structure, and have higher resistivity than the obliquely evaporated alignment films 33B and 43B, so the resistance of the whole liquid crystal display device is increased, thereby current such as ions cannot easily flow. Further, electrical symmetry can be easily controlled through changing the thicknesses of the vertically evaporated films 33A and 43A in the transparent electrode substrate 30 and the pixel electrode substrate 40.

Specifically in the pixel electrode substrate 40, as shown in FIG. 7, the obliquely evaporated alignment film 43B is formed on the whole top surface of the reflective pixel electrode 42 with the vertically evaporated film 43A in between, and in the inter-pixel groove 50, the obliquely evaporated alignment film 43B is partially formed with the vertically evaporated film 43A in between, thereby the following functions and the following effects can be obtained.

For example, an evaporated film of silicon oxide has a property of aligning liquid crystal molecules in the evaporation direction, so in a portion of the liquid crystal in contact with the vertically evaporated film 43A, liquid crystal molecules are aligned vertically with respect to the substrate surface, and in a portion of the liquid crystal in contact with the obliquely evaporated film 43B, liquid crystal molecules having a pretilt angle are aligned obliquely with respect to the substrate surface.

Therefore, as shown in FIG. 7, the obliquely evaporated alignment film 43B is formed on the whole top surface of the reflective pixel electrode 42 with the vertically evaporated film 43A in between, so liquid crystal molecules having, for example, a very small pretilt angle of approximately 1° to 5° are aligned in an evaporation direction (in a 45° diagonal direction of a device, in general) during the application of a voltage. In the inter-pixel groove 50, in the region 52 where the obliquely evaporated alignment film 43B is formed, liquid crystal molecules having a pretilt angle are aligned in the same manner. The vertically evaporated film 43A formed under the obliquely evaporated alignment film 43B has no influence on the alignment by the obliquely evaporated alignment film 43B, and a pretilt angle determined by the obliquely evaporated alignment film 43B directly in contact with the liquid crystal is formed. On the other hand, in the region 51 where the obliquely evaporated alignment film 43B is not formed, liquid crystal molecules are perfectly aligned in a vertical direction with respect to the substrate surface by the vertically evaporated film 43A.

Figure 3:
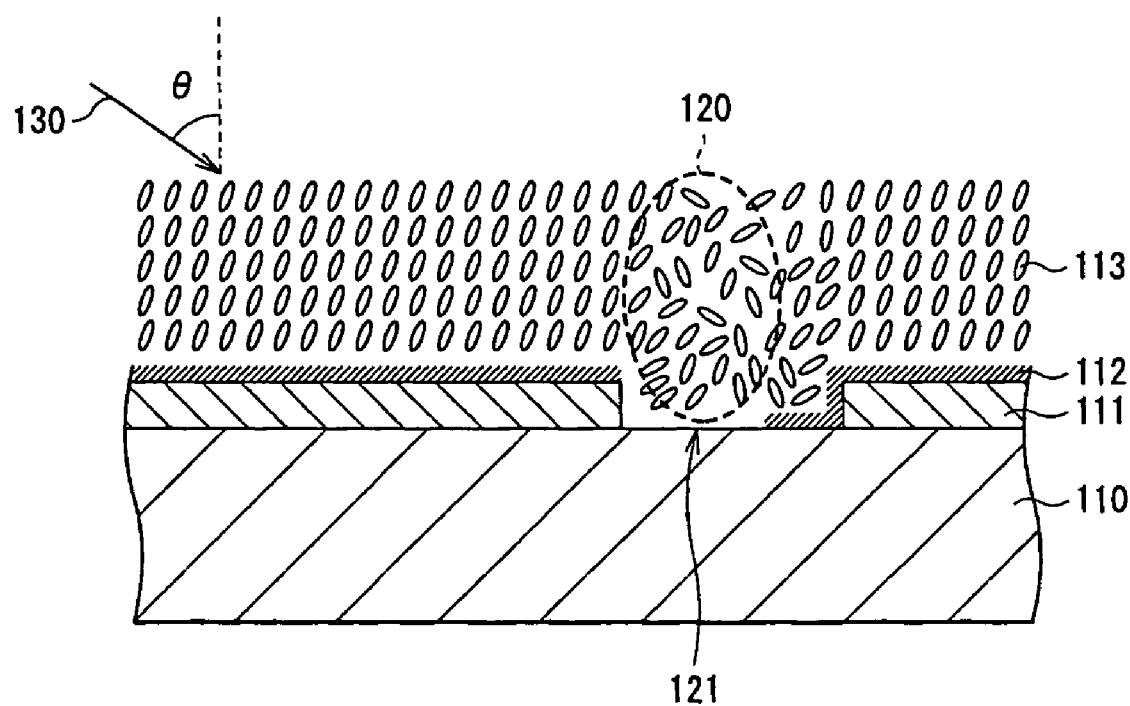
FIG. 3 is a sectional view for describing a misalignment problem which occurs in the reflective liquid crystal display device of the related art.
Figure 4:
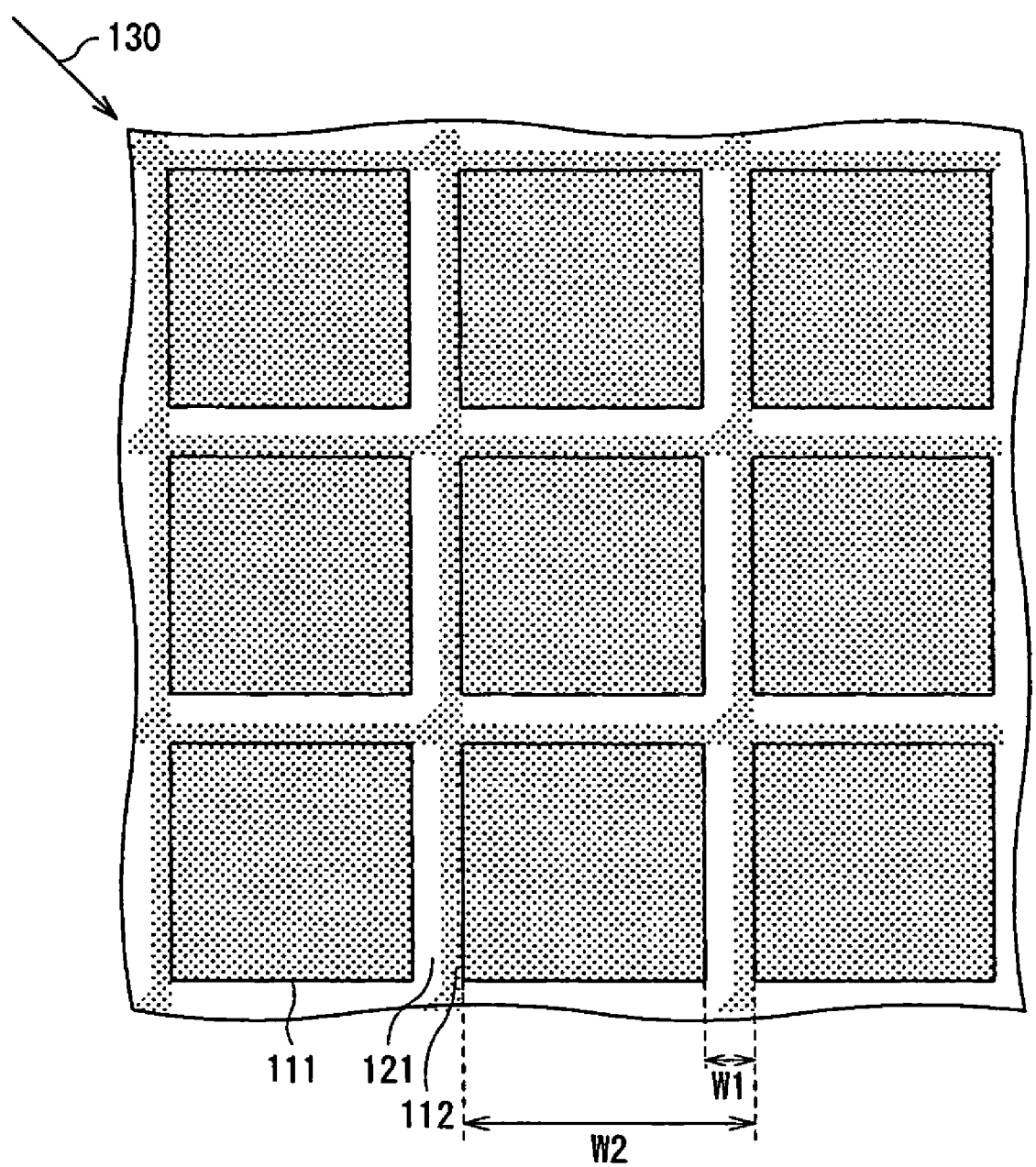
FIG. 4 is a plan view for describing a misalignment problem which occurs in the reflective liquid crystal display device of the related art.

In the film structure of the related art, in the region 51 of the inter-pixel groove 50 where the obliquely evaporated alignment film 43B is not formed, as shown in FIG. 3, the alignment is not vertical and nonuniform, so the region 51 has an adverse influence on the alignment of the vertically aligned liquid crystal on the reflective pixel electrode 42.

On the other hand, in the film structure according to the embodiment, in the region 51, the liquid crystal is aligned in a vertical direction by the vertically evaporated film 43A, so the region 51 hardly has an adverse influence on the vertical alignment of the liquid crystal on the reflective pixel electrode 42. The alignment of the liquid crystal by the vertically evaporated film 43A is slightly different from the alignment of the liquid crystal by the obliquely evaporated alignment film 43B, because the pretilt angle is formed in the alignment of the liquid crystal by the obliquely evaporated alignment film 43B. However, in general, the pretilt angle is as small as 1° to 5°, so in effect, a difference in alignment cannot be recognized as a display image quality at all. The liquid crystal in the inter-pixel groove 50 is perfectly aligned in a vertical direction with respect to the substrate surface, and aligning in a vertical direction is equivalent in energy to inclining in an in-plane direction, so in the case where the liquid crystal is inclined by the application of a voltage, by an interaction with the liquid crystal existing on the pixel surface, the liquid crystal molecules on the vertically evaporated film 43A are inclined in the same direction as that where the liquid crystal molecules on the pixel surface are inclined. Therefore, as a result, misalignment which occurs in the device cannot be found at all. As a result, in the embodiment, a state where all liquid crystal molecules are uniformly aligned in a vertical direction can be stably achieved. Therefore, in the embodiment, misalignment around the inter-pixel groove which occurs in the device does not occur, and vertical alignment can be stably achieved throughout the whole display region. Thereby, superior image quality can be achieved.

As described above, in the reflective liquid crystal display device according to the embodiment, in the transparent electrode substrate 30 and the pixel electrode substrate 40, in a side closer to the vertically aligned liquid crystal 45, the obliquely evaporated alignment films 33B and 43B are laminated on the vertically evaporated films 33A and 43A, respectively, so while maintaining alignment characteristics by the obliquely evaporated alignment films 33B and 43B, an electrical problem due to the film structure can be solved, and ions or the like can be prevented from passing through the obliquely evaporated alignment films 33B and 43B so as to achieve long-term reliability.

Moreover, specifically in the pixel electrode substrate 40, the vertically evaporated film 43A is formed on the whole top surface of the reflective pixel electrode 42 and the whole bottom surface of the inter-pixel groove 50 through evaporation, and the obliquely evaporated alignment film 43B is formed on the whole top surface of the reflective pixel electrode 42 and the region 52 of the inter-pixel groove 50 adjacent to the reflective pixel electrode 42 with the vertically evaporated film 43A in between through evaporation in an oblique direction with respect to the substrate surface of the pixel electrode substrate 40, so in the region 51 where the obliquely evaporated alignment film 43B is not formed in the inter-pixel groove 50, the liquid crystal is aligned in a vertical direction by the vertically evaporated film 43A. Thereby, misalignment and nonuniform alignment due to the structure of the inter-pixel groove 50 can be prevented, and superior image quality can be achieved.

Next, a difference between techniques in the embodiment and Japanese Unexamined Patent Application Publication No. Hei 11-174427 will be described below.

In Japanese Unexamined Patent Application Publication No. Hei 11-174427, as a specific example, a structure in which an $Al_2O_3$ film as a middle layer is formed on an ITO electrode film, and an obliquely evaporated film of $SiO_2$ as an alignment film is formed on the $Al_2O_3$ film is described. In the embodiment, the vertically evaporated films 33A and 43A corresponding to the middle layer can be the same $SiO_2$ films as the obliquely evaporated alignment films 33B and 43B; however, in a technique of Japanese Unexamined Patent application Publication No. Hei 11-174427, the middle layer must have a higher refractive index than $SiO_2$ as an optical requirement, so if the middle layer is made of a material with the same refractive index as in the case of the embodiment, effects cannot be obtained. Moreover, the technique of Japanese Unexamined Patent application Publication No. Hei 11-174427 is a technique for preventing light reflection from an optical standpoint, so it is not from a standpoint of an electrical characteristic of increasing electrical resistance to prevent the passage of ions which is mentioned in the invention. Further, the technique of Japanese Unexamined Patent application Publication No. Hei 11-174427 is targeted for the transparent electrode substrate 30, and the structure of a base film in the pixel electrode substrate 40 is not described at all. On the other hand, the technique of the embodiment is a technique characterized by a two-layer structure in which the obliquely evaporated alignment films 33B and 43B are formed on the vertically evaporated film 33A and 43A as base films in the transparent electrode substrate 30 and the pixel electrode substrate 40, so they are completely different from each other.

Next, a difference between techniques of the embodiment and Japanese Unexamined Patent Application Publication No. 2001-5003 will be described below.

The technique of Japanese Unexamined Patent Application Publication No. 2001-5003 is basically completely different from the technique of the embodiment, even though the technique has a commonality with the technique of the embodiment in forming an alignment film of silicon oxide on the inter-pixel groove 50 through evaporation twice. In the technique of Japanese Unexamined Patent Application Publication No. 2001-5003, a first alignment film and a second alignment film are both obliquely evaporated alignment films, and the films are formed through rotating the substrate in a plane to change the incident angle in the plane. On the other hand, in the embodiment, the first alignment film must be the vertically evaporated film 43A which is evaporated from a vertical direction not an oblique direction. Thereby, in a step of manufacturing the alignment film, a shift from the first alignment film to the second alignment film is not carried out through changing an incident direction in a plane, and as shown in FIGS. 9A and 9B, it is required to change an incident direction from the normal to the substrate. Thus, in the embodiment, before forming the obliquely evaporated alignment film 43B, the vertically evaporated film 43A is formed, so the technique of the embodiment is different in the structure and the manufacturing method from the technique of Japanese Unexamined Patent Application Publication No. 2001-5003.

Specifically in the embodiment, first evaporation is carried out not in a oblique direction but a vertical direction with respect to the substrate surface, because when a film is obliquely formed, a pretilt is formed in the direction, thereby resulting in local unevenness, and in order to effectively forming a film on the whole pixel groove portion, the film must be formed from a vertical direction. Even though the same silicon oxide material is used, a film formed through vertical evaporation is completely different in the structure from a film formed through oblique evaporation as shown in FIG. 10. The obliquely evaporated film has a columnar structure inclined in an incident direction in general.

<Description of Liquid Crystal Display Unit>

Figure 11:
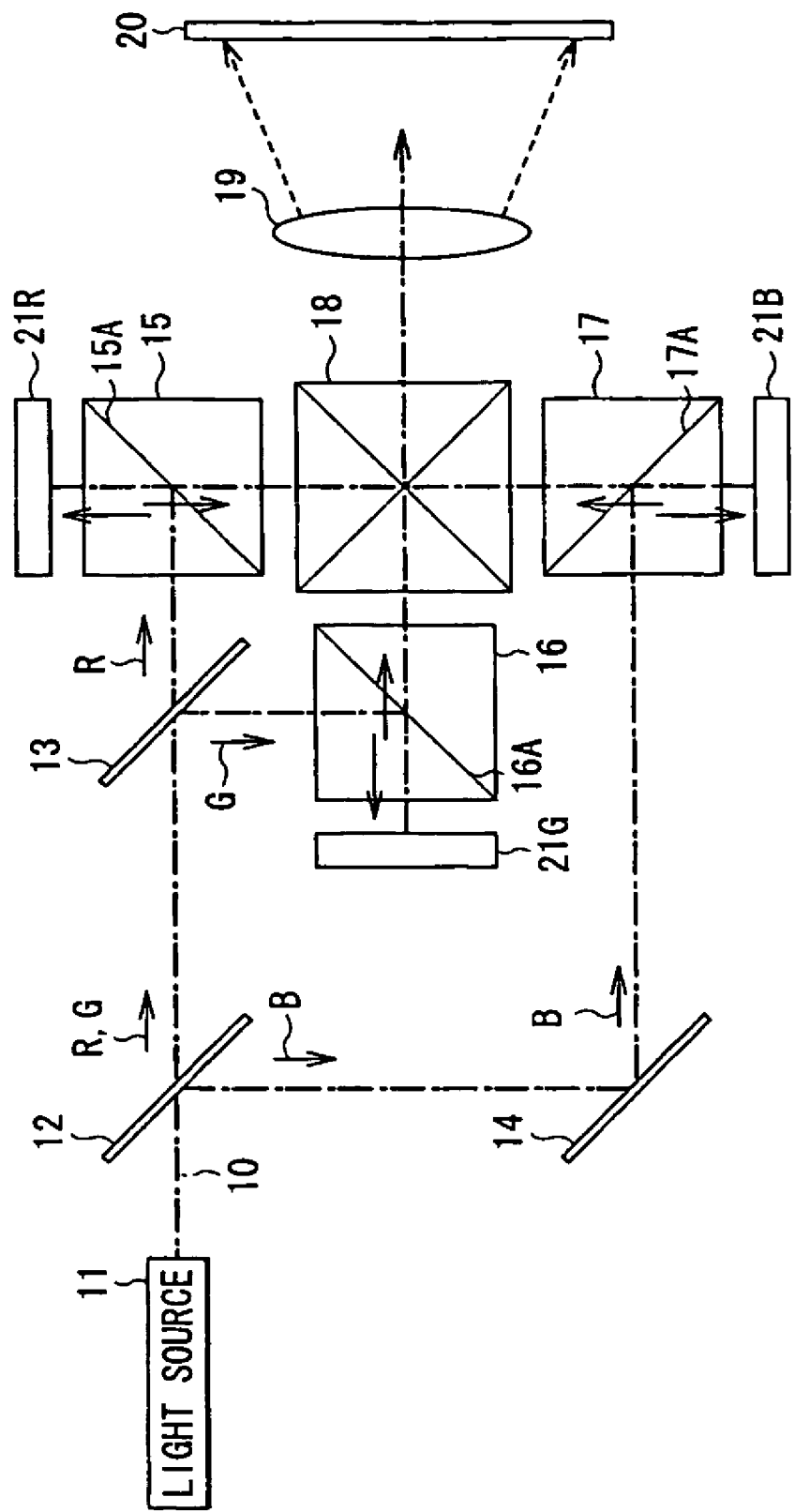
FIG. 11 is an illustration of an example of a liquid crystal display unit using the reflective liquid crystal display device shown in FIG. 5.

Next, an example of a liquid crystal display unit using the reflective liquid display device with the structure shown in FIG. 5 will be described below. As shown in FIG. 11, an example of a reflective liquid crystal projector using the reflective liquid crystal display device as a light valve will be described below.

The reflective liquid crystal projector shown in FIG. 11 is a so-called three-panel system using three liquid crystal light valves 21R, 21G and 21B for red, green and blue to display a color image. The reflective liquid crystal projector comprises a light source 11, dichroic mirrors 12 and 13 and a total reflection mirror 14 along an optical axis 10. The reflective liquid crystal projector further comprises polarizing beam splitters 15, 16 and 17, a synthesizing prism 18, a projection lens 19 and a screen 20.

The light source 11 emits white light including red light (R), blue light (B) and green light (G) which are required to display a color image, and as light source 11, for example, a halogen lamp, a metal halide lamp, a xenon lamp or the like is used.

The dichroic mirror 12 has a function of separating light from the light source 11 into blue light and light of other colors. The dichroic mirror 13 has a function of separating light passing through the dichroic mirror 12 into red light and green light. The total reflection mirror 14 reflects the blue light separated by the dichroic mirror 12 toward the polarizing beam splitter 17.

The polarizing beam splitters 15, 16 and 17 are disposed along the optical paths of red light, green light and blue light, respectively. The polarizing beam splitter 15, 16 and 17 have polarization splitting surfaces 15A, 16A and 17A, respectively, and have a function of dividing each incident color light into two polarized components orthogonal to each other on the polarization splitting surfaces 15A, 16A and 17A. The polarization splitting surfaces 15A, 16A and 17A reflect one polarized component (for example, S-polarized component) and pass the other polarized component (for example, P-polarized component) therethrough.

As the liquid crystal light valves 21R, 21G and 21B, the reflective liquid crystal display devices with the above-described structure (refer to FIG. 5) are used. A predetermined polarized component (for example, S-polarized component) of each color light divided by each of the polarization splitting surfaces 15A, 16A and 17A of the polarizing beam splitters 15, 16 and 17 enters into each of the liquid crystal light valves 21R, 21G and 21B. When the liquid crystal light valves 21R, 21G and 21B are driven by a drive voltage given according to image signals, the liquid crystal light valves 21R, 21G and 21B have a function of modulating incident light and reflecting the modulated light toward the polarizing beam splitters 15, 16 and 17, respectively.

The synthesizing prism 18 has a function of synthesizing the predetermined polarized component (for example, P-polarized component) of each color light which is emitted from each of liquid crystal light valves 21R, 21G and 21B and passes through each of the polarizing beam splitters 15, 16 and 17. The projection lens 19 has a function as a projection means of projecting synthesized light emitted from the synthesizing prism 18 toward the screen 20.

In the reflective liquid crystal projector with the above structure, white light emitted from the light source 11 is separated into blue light and light of other colors (red light and green light) by the function of the dichroic mirror 12. The blue light is reflected toward the polarizing beam splitter 17 by the function of the total reflection mirror 14. The light of other colors is separated into red light and green light by the function of the dichroic mirror 13. The red light and the green light enter into the polarizing beam splitters 15 and 16, respectively.

The polarizing beam splitters 15, 16 and 17 divide each incident color light into two polarized components orthogonal to each other on the polarization splitting surfaces 16A, 16A and 17A, respectively. At this time, the polarization splitting surfaces 16A, 16A and 17A reflect one polarized component (for example, S-polarized component) toward the liquid crystal light valves 21R, 21G and 21B, respectively.

The liquid crystal light valves 21R, 21G and 21B are driven by a drive voltage given according to image signals, and modulate the predetermined polarized component of each color light entered into the liquid crystal light valves 21R, 21G and 21B on a pixel-by-pixel basis. At this time, as the liquid crystal light valves 21R, 21G and 21B, the reflective liquid crystal display devices shown in FIG. 5 are used, so superior characteristics regarding contrast and image quality can be achieved.

The liquid crystal light valves 21R, 21G and 21B reflect each modulated color light toward the polarizing beam splitters 15, 16 and 17, respectively. The polarizing beam splitters 15, 16 and 17 pass only a predetermined polarized component (for example, P-polarized component) among reflected (modulated) light from the liquid crystal light valves 21R, 21G and 21B, respectively, to emit the predetermined polarized component toward the synthesizing prism 18. The synthesizing prism 18 synthesizes the predetermined components of each color light having passed through the polarizing beam splitters 15, 16 and 17 to emit the synthesized light to the projection lens 19. The projection lens 19 projects the synthesized light emitted from the synthesizing prism 18 toward the screen 20. Thereby, an image according to the light modulated by the liquid crystal light valves 21R, 21G and 21B is projected on the screen 20 so as to display a desired image.

As described above, in the reflective liquid crystal projector according to the embodiment, the reflective liquid crystal display devices (refer to FIG. 5) with a structure in which the vertically evaporated film 33A and 43A and the obliquely evaporated alignment films 33B and 43B are laminated in the transparent electrode substrate 30 and the pixel electrode substrate 40, respectively, are used as the liquid crystal light valves 21R, 21G and 21B, so long-term reliability can be achieved, and an image with high contrast and superior image quality can be displayed.

EXAMPLES

Next, specific characteristics of the reflective liquid crystal display device according to the embodiment regarding burn-in in a long-term drive will be described referring to examples. Before describing the examples, as comparative examples, the characteristics of a reflective liquid crystal display device of the related art will be described below.

Comparative Examples 1 and 2

Comparative Examples 1 and 2 will be described below. A test sample of the reflective liquid crystal display device as Comparative Example 1 was formed as below. At first, after a glass substrate on which a transparent electrode was formed and a silicon drive substrate on which an aluminum electrode was formed as a reflective pixel electrode were cleaned, they were introduced into an evaporation apparatus to form a silicon oxide film as an alignment film on each substrate through oblique evaporation at an evaporation angle of 50° to 55° with respect to the substrate. The thickness of the alignment film was 50 nm. The alignment was controlled so that the pretilt angle of the liquid crystal was approximately 2.5°. After that, the substrates on which the alignment film was formed faced each other, and an adequate number of glass beads with a diameter of 2 µm were distributed therebetween to bond the substrates together. Further, a vertical liquid crystal material with negative dielectric anisotropy Δ∈ manufactured by Merck was injected between the substrates so as to form the test sample of the reflective liquid crystal display device. A pixel pitch of the aluminum electrode on the silicon drive substrate was 9 µm, and the width of a groove between pixels was 0.6 µm. Moreover, a test sample in which the aluminum electrode was overcoated with a passivation film of $SiO_2$ with a thickness of 45 nm for protecting the pixel electrode through CVD was formed as Comparative Example 2 through the same method.

Each of the test samples was introduced into a projector, and after displaying a monoscope pattern for a long time, burn-in was checked. As a result, in the test sample including no passivation film, burn-in was slightly observed after a continuous drive for 200 hours. The test sample including the passivation film was in good condition until a drive for 400 hours, because it could be considered that the passivation film prevented ions or the like from being leaked from the surface of the aluminum electrode by an electric field. The above observation results are shown in FIG. 12 together with the results of examples which will be described later.

Figure 1:
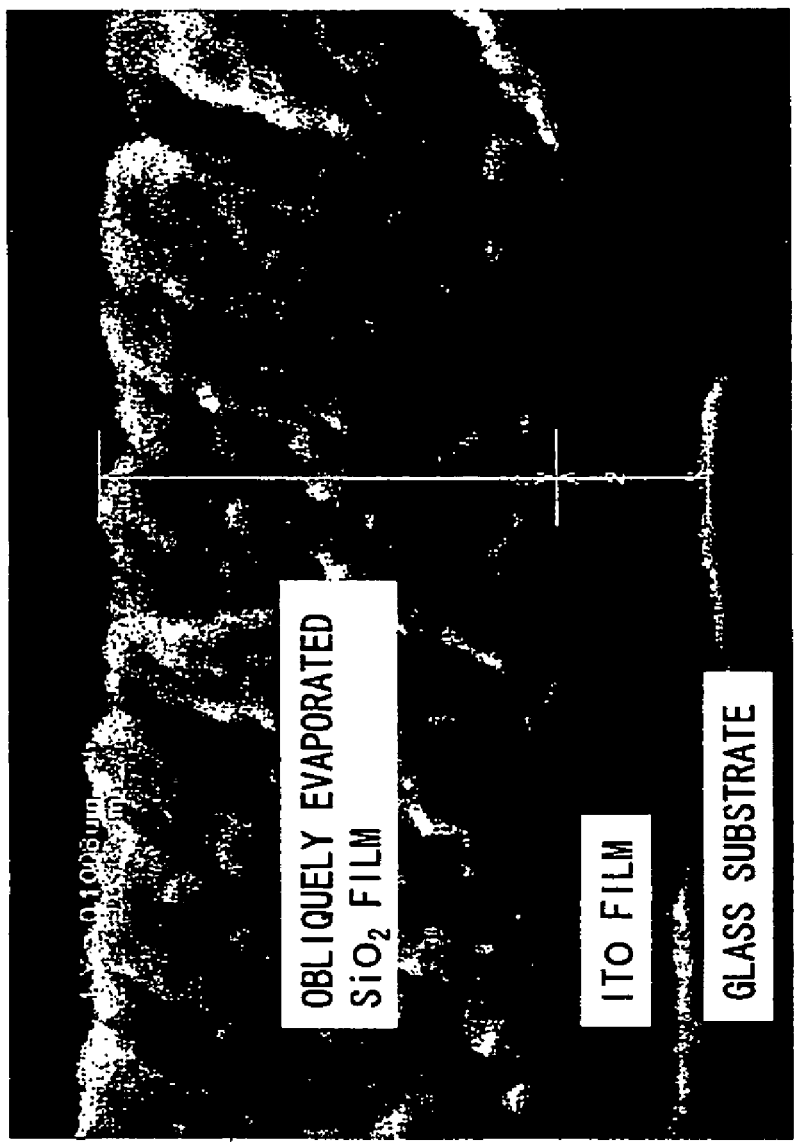
FIG. 1 is a cross sectional photograph of an alignment film in a reflective liquid crystal display device of the related art.

Moreover, when the sectional structure of the obliquely evaporated $SiO_2$ film used in the experiment was observed with a scanning electron microscope, a columnar structure shown in FIG. 1 was observed. It was found out that columnar grains (crystal grains) inclined to an incident direction in evaporation were grown, and a grain boundary portion between grains had a clearance structure as shown in FIG. 1. It could be considered that the grain boundary went through the film in an oblique direction, so ions or the like easily passed through the film. When the resistivity of the film was measured, it was 4 to $6 \times 10^{11}$ Ωcm, which was approximately one-half to one-fifth the resistivity of the vertically evaporated $SiO_2$ film which will be described later. Therefore, it was found out that the resistivity of the film was very low.

Examples 1 and 2

Next, Examples 1 and 2 will be described below. Basically, test samples of the reflective liquid crystal display device were formed according to the same method and the same specifications as those in the above comparative examples, except for the alignment film on the pixel electrode. More specifically, after a glass substrate on which a transparent electrode was formed and a silicon drive substrate on which an aluminum electrode was formed as a reflective pixel electrode were cleaned, an alignment film was formed through evaporation by a method described below, and then a vertical liquid crystal material with negative dielectric anisotropy Δ∈ manufactured by Merck was injected between the substrates to form a reflective liquid crystal display device as Example 1. The specifications of the silicon drive substrate was the same as those in the above comparative examples, so a pixel pitch was 9 µm and the width of a groove between pixels was 0.6 µm. A reflective liquid crystal display device in which a passivation film was formed on the aluminum electrode was formed as Example 2 in a like manner.

However, unlike the above comparative examples, in the examples, the alignment film on each substrate had a structure corresponding to FIG. 5. A method of forming the alignment film will be described below. As shown in FIG. 9, each cleaned substrate was introduced into the evaporation apparatus 80 with a substrate rotation system in which the incident angle of the evaporation particles 83 could be changed. At first, a silicon oxide film with a thickness of 50 nm was formed in a position where the evaporation particles 83 vertically entered from the evaporation source 81 to the substrate. After that, without breaking vacuum, the substrate was inclined at an angle of θ=55° from the direction of the normal, and the same silicon oxide film was formed through oblique evaporation from the same evaporation source 81. The thickness of the silicon oxide film was 50 nm. The film formation conditions were the same in the substrate on which the transparent electrode was formed and the substrate on which the pixel electrode was formed.

FIG. 10 shows a cross sectional photograph (by a scanning electron microscope photograph) of the film structure of the test sample of Example 1 shown in FIG. 12 as a representative. In the obliquely evaporated film, a clear columnar structure was observed, but in the vertically evaporated film corresponding to a base for the obliquely evaporated film, no columnar structure was observed, and compared to the obliquely evaporated film, the vertically evaporated film was denser. Moreover, a boundary or a crack corresponding to an interface between the films was not observed, so it was found out that the vertically evaporated film and the obliquely evaporated film were successively formed.

When only the resistivity of the vertically evaporated film was measured separately, the resistivity was 1 to $2 \times 10^{12}$ Ωcm, and it was found out that the resistivity was two to five times higher than that of the obliquely evaporated film. In a two-layer film including the vertically evaporated film and the obliquely evaporated film, the same high resistivity was shown.

After forming the test samples, as in the case of the comparative examples, each of the test samples was introduced into the projector, and after displaying a monoscope pattern for a long time, burn-in was checked. In each test sample, no burn-in was observed for 1000 hours or more. The observation results are shown in FIG. 12. It was obvious from the results that applying a vertical base film structure to both of the substrate on which the transparent electrode was formed and the substrate on which the pixel electrode was formed was effective.

Figure 8:
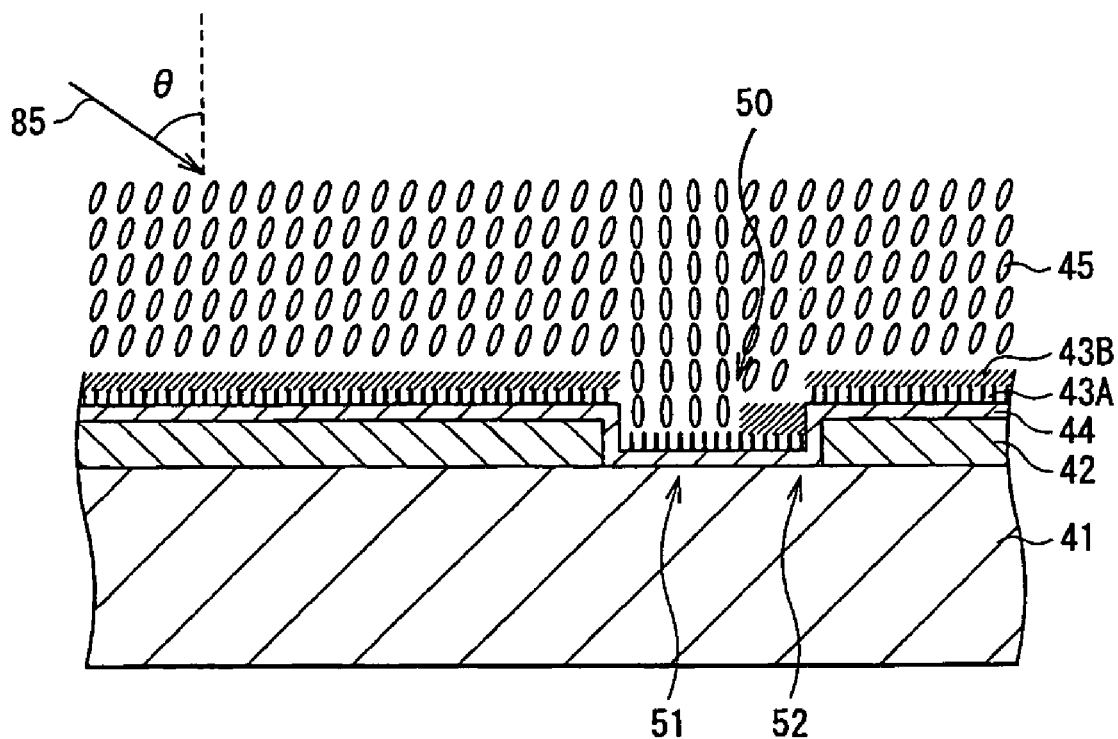
FIG. 8 is a sectional view of an example of the pixel electrode substrate in the case where a passivation film is disposed on a pixel electrode.

As shown in FIG. 12, the test sample in which the silicon drive substrate included the passivation film obtained a stabler result. The passivation film was a $SiO_2$ film formed through CVD. The CVD is a film formation technique used in a normal LSI process. When a film was formed through the CVD, as shown in FIG. 8, the passivation film was formed so that the whole pixel electrode was covered with the passivation film. In general, the thickness of the aluminum pixel electrode was 150 nm to 250 nm; however, as shown in FIG. 8, a side surface of the pixel electrode was fully covered with the passivation film. On the other hand, as shown in FIG. 7, it was difficult to form the vertically evaporated film on the side surface of the pixel electrode. Even though the evaporation particles entered in a vertical direction, all of the evaporation particles did not enter in straight lines. Therefore, even if the vertically evaporated film was formed on the side surface of the pixel electrode, the thickness of the vertically evaporated film was very thin. Although the area of the side surface was extremely small, it could be considered that an extremely small number of ions were leaked from aluminum metal in the side surface. It was obvious from the experiment that an effective measure against the leakage of ions was to cover the whole pixel electrode with the passivation film in advance. A film made of a material other than oxide, for example, nitride worked well as the passivation film, as long as the whole pixel electrode was covered with the film.

Moreover, in the experiment, in the evaporation apparatus 80 shown in FIGS. 9A and 9B, a technique of forming a two-layer film as below was used. In the technique, at first, vertical evaporation was carried out, and during blocking the evaporation particles 83 by a shutter 82, the substrate was rotated, and the shutter 82 was opened again to carry out oblique evaporation, thereby the two-layer film was formed. By the technique, sufficient effects could be obtained; however, a technique of rotating the substrate at some midpoint of evaporation without interrupting vertical evaporation may be applicable.

Next, specific characteristics of the reflective liquid crystal display device according to the embodiment regarding the alignment in the inter-pixel groove will be described referring to examples. Before describing the examples, as comparative examples, the characteristics of the reflective liquid crystal display device of the related art will be described below.

Comparative Examples 3 through 6

Figures 2A, 2B:
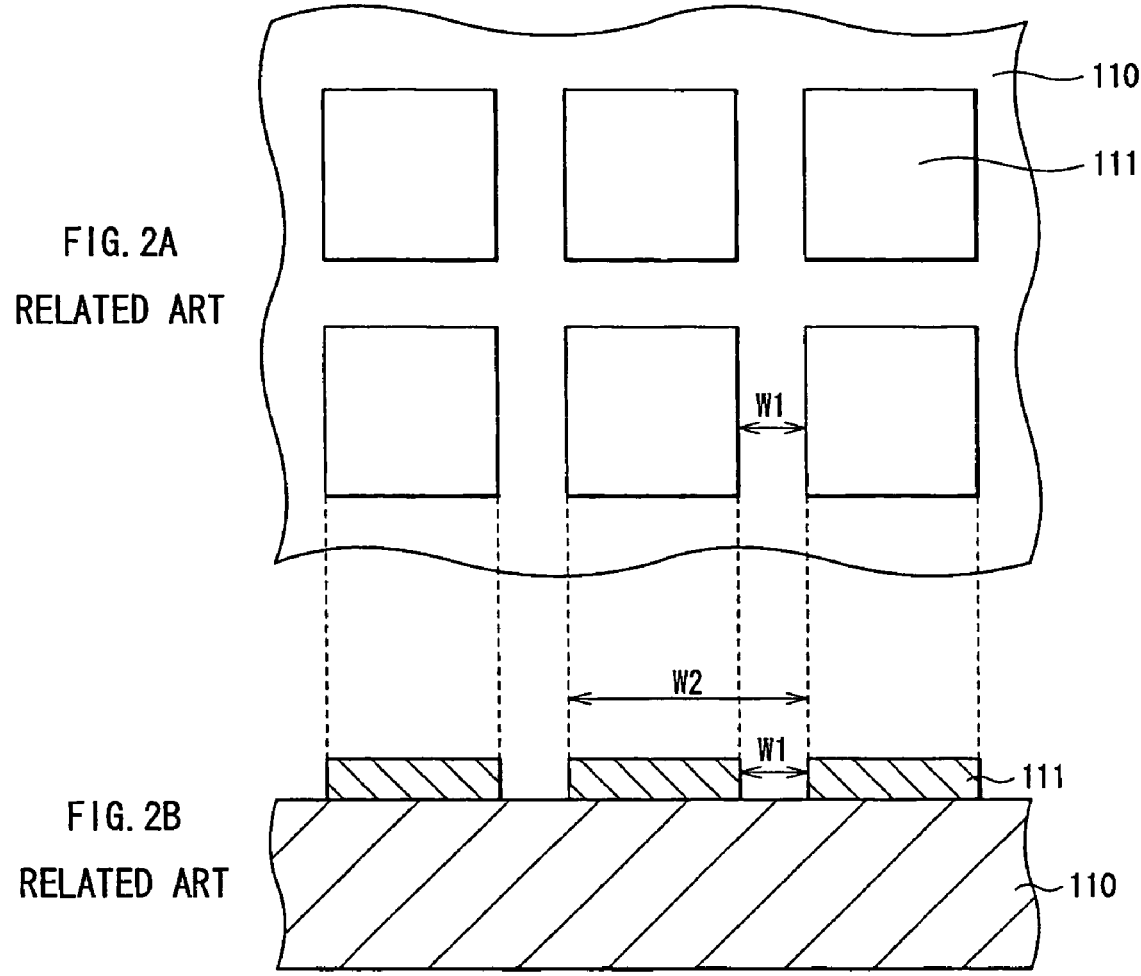
FIGS. 2A and 2B are a plan view and a sectional view of the reflective liquid crystal display device of the related art on a pixel electrode substrate side, respectively.

Comparative Examples 3 through 6 will be described below. Each of test samples of the reflective liquid crystal display device as the comparative examples was formed as follows. At first, after a glass substrate on which a transparent electrode was formed and a silicon drive substrate on which an aluminum electrode was formed as a reflective pixel electrode were cleaned, they were introduced into an evaporation apparatus to form a silicon oxide film as an alignment film on each substrate through oblique evaporation at an evaporation angle of 50° to 55° with respect to the substrate. The thickness of the alignment film was 50 nm. The alignment was controlled so that the pretilt angle of the liquid crystal was approximately 2.5°. After that, the substrates on which the alignment film was formed faced each other, and an adequate number of glass beads with a diameter of 2 μm were distributed therebetween to bond the substrates together. Further, a vertical liquid crystal material with negative dielectric anisotropy $\Delta\epsilon$ manufactured by Merck was injected between the substrates so as to form each test sample of the reflective liquid crystal display device. A pixel pitch W2 (refer to FIGS. 2A and 2B) of the aluminum electrode on the silicon drive substrate was 9 μm, and the width of a groove between pixels, that is, an inter-pixel space W1 was changed to 0.6 μm and 0.35 μm (in Comparative Examples 3 and 4 in FIG. 13). Moreover, test samples in which the aluminum electrode was overcoated with a passivation film of $SiO_2$ with a thickness of 45 nm for protecting the pixel electrode were formed through the same method (as Comparative Examples 5 and 6 in FIG. 13).

After forming the reflective liquid crystal display devices, results of observing the alignment state of the liquid crystal in a black level with a microscope are shown in FIG. 13 together with the results of examples which will be described later. In all of the test samples (that is, Comparative Examples 3 through 6), a nonuniform alignment area in which the black level was higher than that in a pixel portion, and which had unevenness obviously different from that in its surroundings existed in an area around the edge of the reflective pixel electrode and in the vicinity of the inter-pixel groove. When the alignment of the liquid crystal molecules in the area was observed with a polarizing microscope while rotating a polarizing axis, it was found out that in an effective pixel, the liquid crystal molecules were perfectly vertically aligned, but the liquid crystal in the inter-pixel groove hardly included a desired vertical component, and was randomly aligned. Moreover, when a voltage is applied to each test sample to drive the liquid crystal, in the top surface of the pixel, the reflectivity was increased according to the magnitude of the voltage as normal, thereby the top surface of the pixel reached a white level, but on the other hand, when a considerable amount of voltage was applied, an area around the inter-pixel groove reached the white level; however, with a gray-scale voltage, the reaction was obviously slow, so when an image with gray levels was displayed, in an area around the pixel, unevenness in brightness which was different from that in the pixel was observed. The tendency was observed regardless of whether the passivation film was disposed on the pixel electrode or not.

Examples 3 through 6

Examples 3 through 6 will be described below. Basically, test samples of the reflective liquid crystal display device were formed according to the same method and the same specifications as those in the above comparative example. More specifically, after a glass substrate on which a transparent electrode was formed and a silicon drive substrate on which an aluminum electrode was formed as a reflective pixel electrode were cleaned, the alignment film was formed on each substrate through evaporation by a method which will be described later, and after that, a vertical liquid crystal material with negative dielectric anisotropy $\Delta\epsilon$ manufactured by Merck was injected between the substrates so as to form each of the test samples of the reflective liquid crystal display device. The specifications of the silicon drive substrate were the same as those of the above comparative examples, and the pixel pitch W2 was 9 μm, and the width of a groove between pixels, that is, the inter-pixel space W1 was changed to 0.6 μm and 0.35 μm (in Examples 3 and 4 in FIG. 13). The reflective liquid crystal display devices in which the passivation film was formed on the aluminum electrode were formed in a like manner (as Examples 5 and 6 in FIG. 13).

However, in the examples, unlike the above comparative examples, the structure of the alignment on the pixel electrode corresponded to a structure shown in FIG. 7 or 8. A method of forming the alignment film will be described as below. As shown in FIGS. 9A and 9B, the cleaned silicon drive substrate was introduced into the evaporation apparatus 80 with a substrate rotation system in which the incident angle of the evaporation particles 83 could be changed. At first, a silicon oxide film with a thickness of 50 nm was formed in a position where the evaporation particles 83 vertically entered from the evaporation source 81 to the substrate. After that, without breaking vacuum, the substrate was inclined at an angle of θ=55° from the direction of the normal, and the same silicon oxide film was formed through oblique evaporation from the same evaporation source 81. The thickness of the silicon oxide film was 50 nm.

FIG. 10 shows a cross sectional photograph (by a scanning electron microscope photograph) of the film structure of the test sample of Example 3 shown in FIG. 13 as a representative. In the obliquely evaporated film, a clear columnar structure was observed. It was clear that the vertically evaporated film of silicon oxide was formed in the inter-pixel groove as designed. It was found out that the vertically evaporated film existed as a base on the surface of the pixel electrode, and on the vertically evaporated film, the obliquely evaporated film was successively formed.

The alignment state of the liquid crystal in each test sample with the pixel structure in a black level was observed with a microscope through the same method as that in the above comparative examples. FIG. 13 shows the observation results. In all of the test samples of the examples, a non-uniform alignment area was not observed in an area around a pixel edge or the inter-pixel groove at all. When the alignment of the liquid crystal molecules in the area was observed with a polarizing microscope while rotating a polarizing axis, it was found out that the liquid crystal in the inter-pixel groove was perfectly vertically aligned. Moreover, when a voltage is applied to each test sample to drive the liquid crystal, the liquid crystal molecules were uniformly react regardless of whether they were disposed in the inter-pixel groove or on the pixel electrode surface, and when a gray-scale voltage was applied, superior display image quality without unevenness in brightness was observed. The display image quality was superior regardless of whether the passivation film was disposed on the pixel electrode or not.

In the experiments, two types of the reflective liquid crystal display devices having a width of the inter-pixel groove of 0.6 μm and 0.35 μm were checked, the widths of the inter-pixel groove corresponded to aperture ratios of 87.1% and 92.4%. In the examples, in the case where the width of the inter-pixel groove was 0.35 μm, superior vertical alignment was obtained throughout the display region, so a high aperture ratio and a high reflectivity could be achieved.

The invention is not limited to the above embodiment, and is variously modified. For example, in the above embodiment, the three-panel system projector is described as an example of the projector. However, the invention can be widely applied to any other system projectors such as a single panel system.

While the invention has been described with reference to specific embodiment chosen for purpose of illustration, it should be apparent that numerous modification could be made thereto by those skilled in the art without departing from the basic concept and scope of the invention.

What is claimed is:

1. A reflective liquid crystal display device, comprising: a pixel electrode substrate and a transparent electrode substrate facing each other with a vertically aligned liquid crystal in between,
    wherein in a side of each of the pixel electrode substrate and the transparent electrode substrate closer to the vertically aligned liquid crystal, at least a vertically evaporated film formed through evaporation from a vertical direction with respect to a substrate surface, and an obliquely evaporated alignment film formed on the vertically evaporated film through evaporation from an oblique direction with respect to the substrate surface are laminated in order.

2. A reflective liquid crystal display device according to claim 1, wherein
    the vertically evaporated film and the obliquely evaporated alignment film are evaporated film made of silicon oxide.

3. A reflective liquid crystal display device according to claim 1, wherein
    the pixel electrode substrate includes a plurality of reflective pixel electrodes, and
    a film made of oxide or nitride, or a laminate film thereof is further formed on the whole top surfaces of the reflective pixel electrodes and the whole groove portion between adjacent reflective pixel electrodes, and the vertically evaporated film and the obliquely evaporated alignment film are formed on the film.

4. A reflective liquid crystal display unit, comprising:
    a reflective liquid crystal display device,
    wherein the liquid crystal display unit displays an image by using light modulated by the reflective liquid crystal display device,
    the reflective liquid crystal display device comprises:
    a pixel electrode substrate;
    a transparent electrode substrate facing the pixel electrode substrate; and
    a vertically aligned liquid crystal injected between the pixel electrode substrate and the transparent electrode substrate, and
    in a side of each of the pixel electrode substrate and the transparent electrode substrate closer to the vertically aligned liquid crystal, at least a vertically evaporated film formed through evaporation from a vertical direction with respect to a substrate surface, and an obliquely evaporated alignment film formed on the vertically evaporated film through evaporation from an oblique direction with respect to the substrate surface are laminated in order.

5. A liquid crystal display unit according to claim 4, further comprising:
    a light source; and
    a projection means of projecting light emitted from the light source and modulated by the reflective liquid crystal display device to a screen,
    wherein the liquid crystal display unit is used as a reflective liquid crystal projector.

6. A method of manufacturing a reflective liquid crystal display device, the reflective liquid crystal display device comprising a pixel electrode substrate and a transparent electrode substrate which face each other with a vertically aligned liquid crystal in between,
    wherein each of a step of manufacturing the pixel electrode substrate and a step of manufacturing the transparent electrode substrate comprises the steps of:

forming a vertically evaporated film in a side closer to the vertically aligned liquid crystal through evaporation from a vertical direction with respect to a substrate surface; and after forming the vertically evaporated film, forming an obliquely evaporated alignment film on the vertically evaporated film through evaporation from an oblique direction with respect to the substrate surface.

7. A method of manufacturing a reflective liquid crystal display device according to claim 6, wherein in each of the step of manufacturing the pixel electrode substrate and the step of manufacturing the transparent electrode substrate, the direction of the normal to the substrate surface and the incident direction of an evaporation material from an evaporation source are adjusted to be in agreement with each other, and the vertically evaporated film is formed in a vacuum, and after that, while maintaining the vacuum, each substrate is inclined so that the direction of the normal to the substrate surface forms a predetermined angle with respect to the incident direction of the evaporation material, thereby the obliquely evaporated alignment film is formed through evaporation from an oblique direction with respect to the substrate surface.

8. A method of manufacturing a reflective liquid crystal display device according to claim 6, wherein the vertically evaporated film and the obliquely evaporated alignment film are evaporated films made of silicon oxide.

9. A method of manufacturing a reflective liquid crystal display device according to claim 6, wherein the pixel electrode substrate includes a plurality of reflective pixel electrodes, and the step of manufacturing the pixel electrode substrate further comprises the step of forming a film of oxide or nitride or a laminate film thereof on the whole top surfaces of the reflective pixel electrodes and the whole groove portion between adjacent reflective pixel electrodes, and on the film, the vertically evaporated film and the obliquely evaporated alignment film are formed.

10. A reflective liquid crystal display device comprising:
a pixel electrode substrate and a transparent electrode substrate facing each other with a vertically aligned liquid crystal in between, wherein in a side of the pixel electrode substrate facing the transparent electrode substrate, at least a plurality of reflective pixel electrodes, a vertically evaporated film formed on the whole surfaces of the reflective pixel electrodes and the whole groove portion between adjacent reflective pixel electrodes through evaporation from a vertical direction with respect to the substrate surface of the pixel electrode substrate, and an obliquely evaporated alignment film formed on the whole top surfaces of the reflective pixel electrodes and a part of the groove portion between adjacent reflective pixel electrodes with the vertically evaporated film in between through evaporation from an oblique direction with respect to the substrate surface of the pixel electrode substrate are laminated in order.

11. A reflective liquid crystal display device according to claim 10, wherein the vertically evaporated film and the obliquely evaporated alignment film are evaporated films made of silicon oxide.

12. A reflective liquid crystal display device according to claim 10, wherein a film made of oxide or nitride, or a laminate film thereof is further formed on the whole top surfaces of the reflective pixel electrodes and the whole groove portion between adjacent reflective pixel electrodes, and the vertically evaporated film and the obliquely evaporated alignment film are formed on the film.

13. A reflective liquid crystal display device according to claim 11, wherein the evaporation direction of the obliquely evaporated alignment film in the substrate surface of the pixel electrode substrate is inclined in an oblique direction with respect to the pixel electrode substrate so as to be parallel to the alignment direction of the vertically aligned liquid crystal.

14. A reflective liquid crystal display device according to claim 13, wherein each of the reflective pixel electrodes has a square shape, and an evaporation direction in the substrate surface of the pixel electrode substrate is a diagonal direction of the reflective pixel electrodes.

15. A reflective liquid crystal display unit, comprising:
a reflective liquid crystal display device, wherein the liquid crystal display unit displays an image by using light modulated by the reflective liquid crystal display device, the reflective liquid crystal display device comprises:
a pixel electrode substrate;
a transparent electrode substrate facing the pixel electrode substrate; and
a vertically aligned liquid crystal injected between the pixel electrode substrate and the transparent electrode substrate, and
in a side of the pixel electrode substrate facing the transparent electrode substrate, at least a plurality of reflective pixel electrodes, a vertically evaporated film formed on the whole surfaces of the reflective pixel electrodes and the whole groove portion between adjacent reflective pixel electrodes through evaporation from a vertical direction with respect to the substrate surface of the pixel electrode substrate, and an obliquely evaporated alignment film formed on the whole top surfaces of the reflective pixel electrodes and a part of the groove portion between adjacent pixel electrodes with the vertically evaporated film in between through evaporation from an oblique direction with respect to the substrate surface of the pixel electrode substrate are laminated in order.

16. A liquid crystal display unit according to claim 15, further comprising:
a light source; and
a projection means of projecting light emitted from the light source and modulated by the reflective liquid crystal display device to a screen,
wherein the liquid crystal display unit is used as a reflective liquid crystal projector.

17. A method of manufacturing a reflective liquid crystal display device, the reflective liquid crystal display device comprising a pixel electrode substrate including a plurality of reflective pixel electrodes and a transparent electrode substrate including a transparent electrode which face each other with a vertically aligned liquid crystal in between, the method comprising the steps of:

forming a vertically evaporated film on the top surfaces of the reflective pixel electrodes and a groove portion between adjacent reflective pixel electrodes in a side of the pixel electrode substrate facing the transparent electrode substrate through evaporation from a vertical direction with respect to the substrate surface of the pixel electrode substrate; and after forming the vertically evaporated film, forming an obliquely evaporated alignment film on the top surfaces of the reflective pixel electrodes and the groove portion between adjacent reflective pixel electrodes with the vertically evaporated film in between through evaporation from an oblique direction with respect to the substrate surface of the pixel electrode substrate.

18. A method of manufacturing a reflective liquid crystal display device according to claim 17, wherein the direction of the normal to the substrate surface of the pixel electrode substrate and the incident direction of an evaporation material from an evaporation source are adjusted to be in agreement with each other, and the vertically evaporated film is formed in a vacuum, and after that, while maintaining vacuum, the pixel electrode substrate is inclined so that the direction of the normal to the substrate surface forms a predetermined angle with respect to the incident direction of the evaporation material, thereby the obliquely evaporated alignment film is formed through evaporation from an oblique direction with respect to the substrate surface.

19. A method of manufacturing a reflective liquid crystal display device according to claim 17, wherein the vertically evaporated film and the obliquely evaporated alignment film are evaporated films made of silicon oxide.

20. A method of manufacturing a reflective liquid crystal display device according to claim 17, further comprising the step of:

forming a film of oxide or nitride or a laminate film thereof on the whole top surfaces of the reflective pixel electrodes and the whole groove portion between adjacent reflective pixel electrodes, and on the film, the vertically evaporated film and the obliquely evaporated alignment film are formed.

* * * * *